(12) United States Patent
Deguchi et al.

(10) Patent No.: US 7,197,495 B2
(45) Date of Patent: *Mar. 27, 2007

(54) SEARCHING SYSTEM, SEARCHING UNIT, SEARCHING METHOD, DISPLAYING METHOD FOR SEARCH RESULTS, TERMINAL UNIT, INPUTTING UNIT, AND RECORD MEDIUM

(75) Inventors: Yuichiro Deguchi, Kanagawa (JP); Akiko Matsuoka, Chiba (JP)

(73) Assignee: Sony Corporation, Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 10/625,666

(22) Filed: Jul. 24, 2003

(65) Prior Publication Data

US 2006/0010120 A1 Jan. 12, 2006

Related U.S. Application Data

(62) Division of application No. 09/695,636, filed on Oct. 24, 2000.

(30) Foreign Application Priority Data

Oct. 26, 1999 (JP) .................................. 11-304389
Oct. 28, 1999 (JP) .................................. 11-306817

(51) Int. Cl.
  *G06F 17/30* (2006.01)
(52) U.S. Cl. ............................................. 707/3; 707/10
(58) Field of Classification Search ................. 707/3, 707/10, 100–104.1
See application file for complete search history.

(56) References Cited

U.S. PATENT DOCUMENTS

RE32,451 E * 7/1987 Proctor et al. ................. 62/149

(Continued)

FOREIGN PATENT DOCUMENTS

JP 4-13184 1/1992

(Continued)

OTHER PUBLICATIONS

Ryuji Kubozono, et al., "A Study on 'Indexed-by-Music' Information Retrieva SystemI", Proceedings of the 1995 IEICE General Conference, Mar. 27-30, 1995, 9 pages (with English Translation).

(Continued)

*Primary Examiner*—Joon Hwan Hwang
(74) *Attorney, Agent, or Firm*—Oblon, Spivak, McClelland, Maier & Neustadt, P.C.

(57) ABSTRACT

A searching system for searching contents that were broadcast, the searching system having an inputting unit, a searching unit, and a terminal unit is disclosed, wherein the inputting unit comprises a first storing means for storing information representing at least time at which contents were broadcast corresponding to a predetermined operation, and a first communicating means for transmitting the information representing time stored in the storing means to an external unit, wherein the searching unit comprises a second storing means for correlatively storing information representing contents and broadcast time thereof, and a searching means for searching information representing the contents stored in the second storing means corresponding to the information representing time, and wherein the terminal unit comprises a second communicating means for receiving the information representing time transmitted from the inputting unit through the first communicating means, a third communicating means for transmitting the information representing time received by the second communicating means and receiving search results transmitted from the searching unit, and a first displaying means for displaying the information representing time received by the second communicating means and the search results by the searching unit.

54 Claims, 23 Drawing Sheets

U.S. PATENT DOCUMENTS

| | | | |
|---|---|---|---|
| 5,479,514 A * | 12/1995 | Klonowski | 380/47 |
| 5,818,800 A * | 10/1998 | Barker | 369/29.02 |
| 5,949,492 A * | 9/1999 | Mankovitz | 348/473 |
| 6,033,365 A * | 3/2000 | von Zitzewitz | 600/300 |
| 6,171,136 B1 * | 1/2001 | Liu et al. | 439/466 |
| 6,370,518 B1 * | 4/2002 | Payne et al. | 707/1 |
| 6,578,047 B1 * | 6/2003 | Deguchi | 707/104.1 |

FOREIGN PATENT DOCUMENTS

| | | |
|---|---|---|
| JP | 6-44752 | 2/1994 |
| JP | 6-70292 | 3/1994 |
| JP | 8-32538 | 2/1996 |
| JP | 8-97784 | 4/1996 |
| JP | 8-127187 | 5/1996 |
| JP | 9-102827 | 4/1997 |
| JP | 10-163988 A | 6/1998 |

OTHER PUBLICATIONS

Hohsoh-Gijutsu, "Broadcasting Technologies", vol. 44, No. 9, 1991, pp. 895-899 (with English Translation).

* cited by examiner

| Station name | 95. 5XYZA |
|---|---|
| Area | New York |
| Start time | 12:44:50 |
| End time | 12:49:15 |
| Content | × × × ×　× × × × |

| TERMINAL ID : XXXX-YYYY-ZZZZ | |
|---|---|
| BOOK MARK 1 | 1/11/98    12:45 |
| BOOK MARK 1 | (blank) |
| BOOK MARK 1 | (blank) |
| BOOK MARK 1 | (blank) |
| ⋮ | ⋮ |

Fig. 17
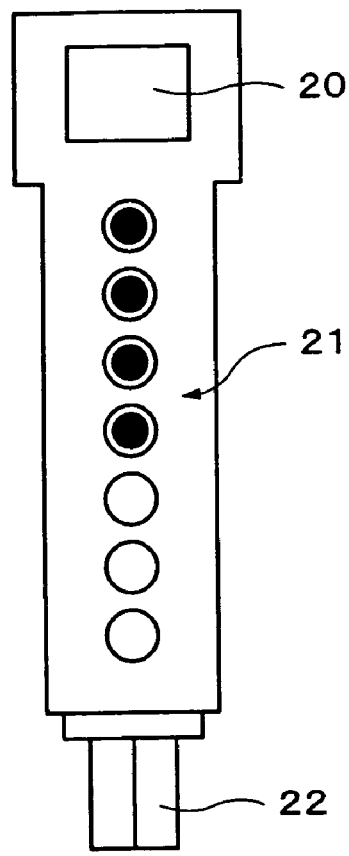
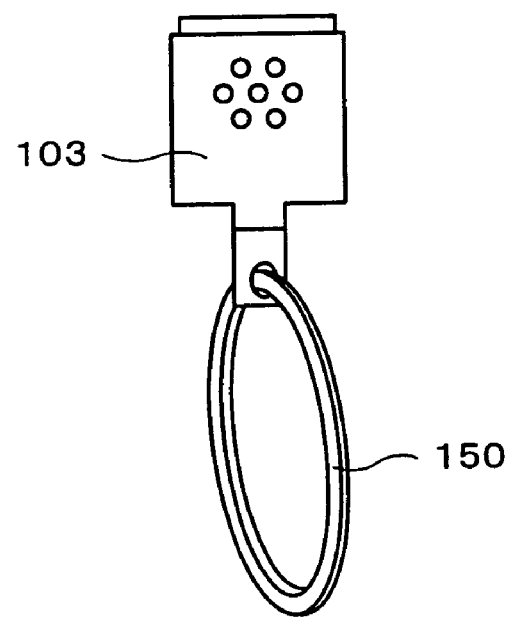

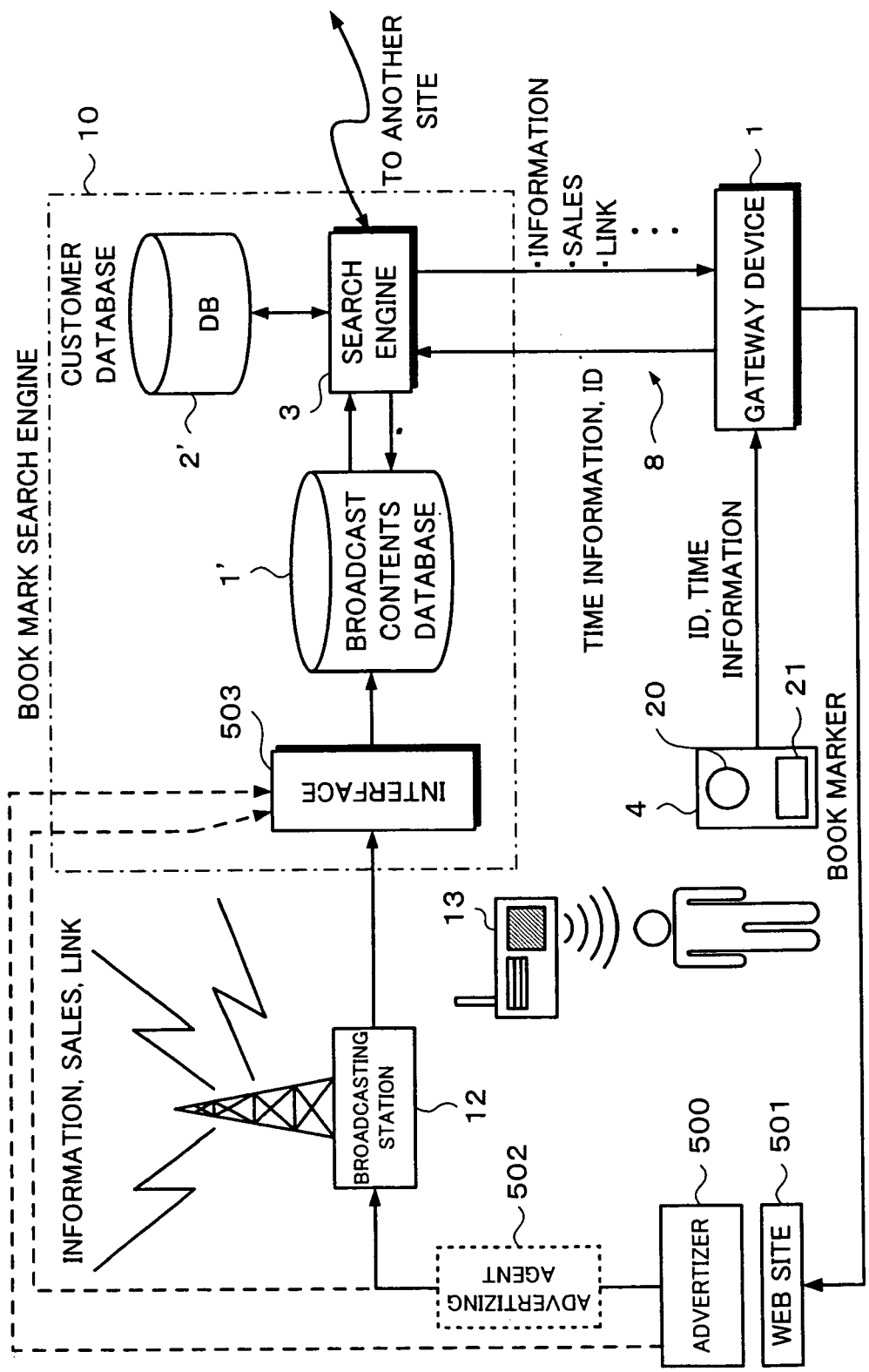

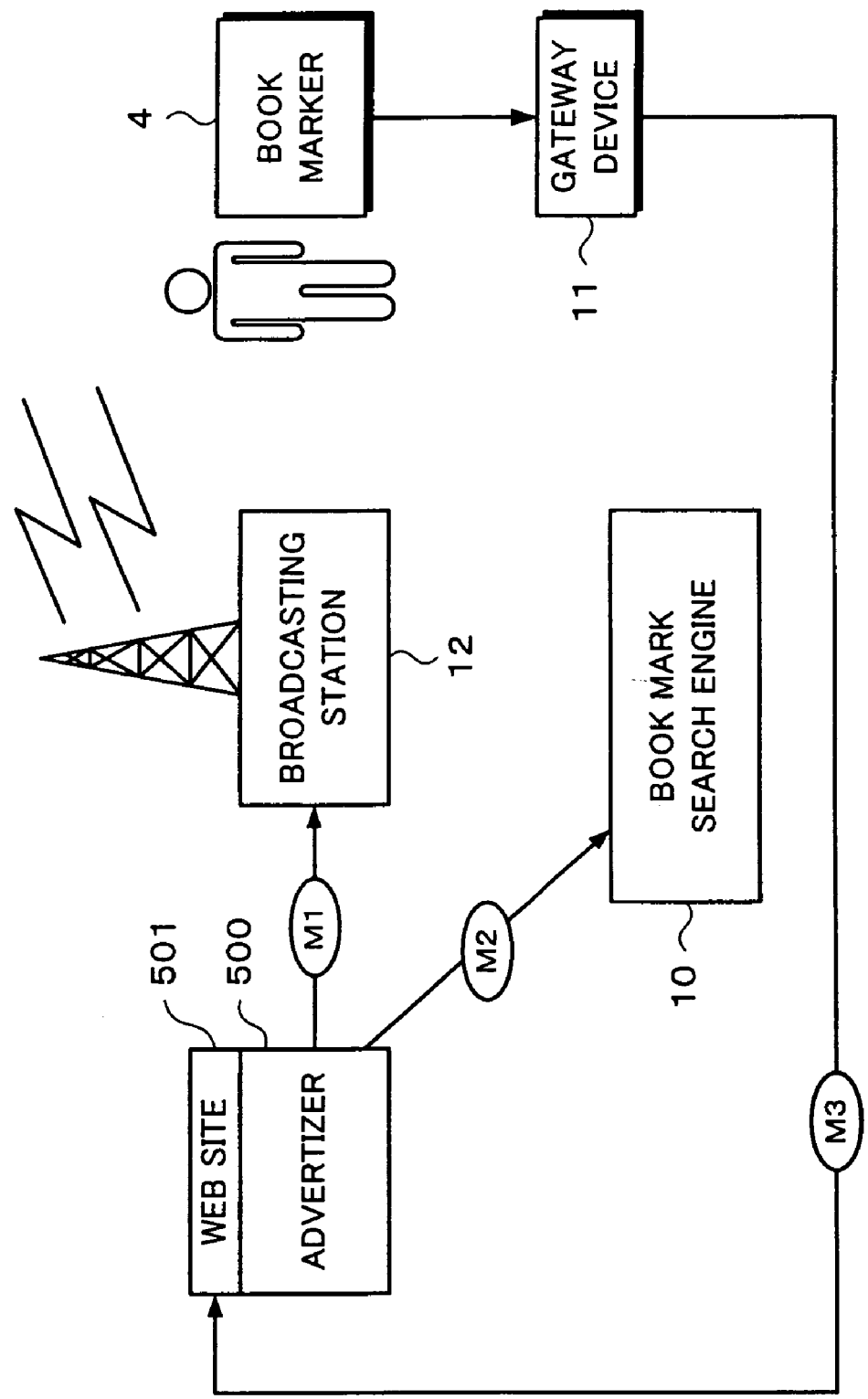

SEARCHING SYSTEM, SEARCHING UNIT, SEARCHING METHOD, DISPLAYING METHOD FOR SEARCH RESULTS, TERMINAL UNIT, INPUTTING UNIT, AND RECORD MEDIUM

BACKGROUND OF THE INVENTION

1. Field of the Invention

The present invention relates to a searching system, a searching unit, a searching method, a displaying method for search results, a terminal unit, an inputting unit, and a record medium that allow information that was broadcast to be searched and properly obtained.

2. Description of the Related Art

A database system that allows data to be searched from a database stored in a computer system is known. The user obtains desired information directly from the database system or using a terminal unit connected thereto through a network. The user inputs a keyword that he thinks it is proper from the terminal unit. The database system searches the database corresponding to the input keyword and provides the user with the search results through the terminal unit. When the database system has provided the user with much information, the user can filter the information using another keyword.

Now, the case that the user searches music data from a database system will be considered. The user can know for example title information of a CD (Compact Disc) that contains his or her desired musical piece from the search results so as to purchase the CD. In this case, the music data is information about a musical piece as a unit of music. The music data is composed of for example a musical piece name, a performer name, an album name (namely, a music CD title), a released date, and a seller. The music data may contain audio data of a musical piece. In the database system, additional information that is for example a performer name, a title, an album name, and so forth is assigned as keywords of music data to each musical piece.

For example, when the user likes a musical piece that was broadcast from a radio broadcasting station, he or she searches the musical piece from such a music database. In this case, the user searches his or her favorite musical piece using keywords corresponding to additional information that was announced along with the musical piece.

In such a conventional music database system, unless the user inputs a proper keyword to the database system, he or she cannot obtain desired results. Thus, conventionally, when the user forgot additional information that was announced along with the musical piece, he or she cannot obtain desired information.

There is a situation that the user always carries a terminal unit that can search a musical piece from a music database and he or she searches a desired musical piece that was broadcast from a radio broadcasting station with the terminal unit. In this case, if the user likes a music that he listened to only a last part thereof, he or she cannot obtain the additional information of the musical piece. Thus, even if the user has such a terminal unit, he or she cannot know a keyword that he or she should input.

Thus, even if a contents provider who sells musical pieces and CDs provides listeners with a radio program, it does not directly contribute to sales of the musical pieces and CDs.

In the case of a digital broadcast, additional information may be superimposed to music data that is broadcast. Thus, the user can obtain additional information about a musical piece from digital data. However, in this case, the broadcasting station should create additional data for each musical piece to be broadcast and superimpose the additional data to the musical piece. Thus, the cost on the broadcasting station side increases. In addition, the user side should prepare a receiving unit that can extract additional information from digital data.

OBJECTS AND SUMMARY OF THE INVENTION

Therefore, an object of the present invention is to provide a searching system, a searching unit, a searching method, a displaying method for search results, a terminal unit, an inputting unit, and a record medium that allow the user to search contents that were broadcast without need to know an accurate keyword.

A first aspect of the present invention is a searching system for searching contents that were broadcast, the searching system having an inputting unit, a searching unit, and a terminal unit, wherein the inputting unit comprises a first storing means for storing information representing at least time at which contents were broadcast corresponding to a predetermined operation, and a first communicating means for transmitting the information representing time stored in the storing means to an external unit, wherein the searching unit comprises a second storing means for correlatively storing information representing contents and broadcast time thereof, and a searching means for searching information representing the contents stored in the second storing means corresponding to the information representing time, and wherein the terminal unit comprises a second communicating means for receiving the information representing time transmitted from the inputting unit through the first communicating means, a third communicating means for transmitting the information representing time received by the second communicating means and receiving search results transmitted from the searching unit, and a first displaying means for displaying the information representing time received by the second communicating means and the search results by the searching unit.

A second aspect of the present invention is a terminal unit for causing contents that were broadcast to be searched, comprising a first communicating means for receiving time information representing predetermined time from an inputting unit and transmitting the information representing the predetermined time to an external unit, a second communicating means for transmitting the information representing the predetermined time received from the first communicating means to a searching unit and receiving search results from the searching unit, the searching unit searching information representing contents from a storing means corresponding to the information representing the predetermined time, the storing means correlatively storing the information representing the contents and broadcast time thereof, and a displaying means for displaying the information representing the predetermined time received by the first communicating means and the search results of the searching unit.

A third aspect of the present invention is a terminal unit for causing contents that were broadcast to be searched, comprising a first storing means for storing time information representing predetermined time corresponding to a predetermined operation, a communicating means for transmitting the information representing the predetermined time to a searching unit and receiving search results from the searching unit, the searching unit searching information representing contents from a second storing means corresponding to the information representing the predetermined time, the second storing means correlatively storing the information representing the contents and broadcast time thereof, and a displaying means for displaying the information representing the predetermined time stored in the first storing means and the search results of the searching unit.

A fourth aspect of the present invention is a searching unit for searching contents that were broadcast, comprising a database for correlatively storing information representing contents and broadcast time thereof, and a communication interface for receiving time information representing predetermined time and identification information of contents from an external unit, wherein the information representing the contents is searched corresponding to the received time information representing the predetermined time and the received identification information of the contents.

A fifth aspect of the present invention is a searching method for searching contents that were broadcast, comprising the steps of (a) storing information representing at least time at which contents were broadcast corresponding to a predetermined operation of an inputting unit to a first storing means, (b) transmitting the information representing time stored in the first storing means to an external unit, (c) causing a searching unit to search information representing contents stored in a second storing means corresponding to the information representing time, (d) receiving the information representing time transmitted from the inputting unit at the first communicating step (b), (e) transmitting the information representing time received at the second communicating step (d) and receiving search results transmitted from the searching unit, (f) displaying the information representing time received at the second communicating step (d), and (g) displaying the search results of the searching unit.

A sixth aspect of the present invention is a searching method for searching contents that were broadcast, comprising the steps of (a) receiving timing information representing predetermined time and identification information of contents from an external unit, (b) searching the information representing the contents from a database corresponding to the received time information representing time and the received identification information of the contents, the database correlatively storing the information representing the contents and broadcast time thereof, and (c) transmitting search results searched at the searching step (b) to the external unit.

A seventh aspect of the present invention is a displaying method for causing a terminal unit to display search results of contents that were broadcast, comprising the steps of (a) receiving time information representing predetermined time from an inputting unit, (b) transmitting the information representing the predetermined time to an external unit, (c) transmitting the information representing the predetermined time received at the first communicating step (a) to a searching unit, the searching unit searching information representing contents from a database corresponding to the information representing the predetermined time, the database correlatively storing the information representing the contents and broadcast time thereof, (d) receiving search results from the searching unit, and (e) displaying the information representing the predetermined time received at the first communicating step (a) and the search results received at the fourth communicating step (d).

An eighth aspect of the present invention is a displaying method for causing a terminal unit to display search results of contents that were broadcast, comprising the steps of (a) storing time information representing predetermined time corresponding to a predetermined operation, (b) transmitting the information representing the predetermined time stored at the storing step (a) to a searching unit, the searching unit searching information representing contents from a database corresponding to the information representing the predetermined time, the database correlatively storing the information representing the contents and broadcast time thereof, (c) receiving search results from the searching unit, and (d) displaying the information representing the predetermined time stored at the storing step (a) and the search results of the contents received at the second communication step (c).

A ninth aspect of the present invention is a record medium for recording a control program that causes search results of contents to be displayed on a terminal unit, the control program causing the terminal unit to perform the steps of (a) receiving time information representing predetermined time from an inputting unit, (b) transmitting the information representing the predetermined time to an external unit, (c) transmitting the information representing the predetermined time to a searching unit, the searching unit searching information representing contents from a database corresponding to the information representing the predetermined time, the database correlatively storing the information representing the contents and broadcast time thereof, (d) receiving search results from the searching unit, and (e) displaying at least the received search results.

A tenth aspect of the present invention is a record medium for recording a control program that causes search results of contents to be displayed on a terminal unit, the control program causing the terminal unit to perform the steps of (a) storing time information representing predetermined time corresponding to a predetermined operation, (b) transmitting the information representing the predetermined time stored at the storing step (a) to a searching unit, the searching unit searching information representing contents from a database corresponding to the information representing the predetermined time, the database correlatively storing the information representing the contents and broadcast time thereof, (c) receiving search results from the searching unit, and (d) displaying at least the search results on the terminal unit.

An eleventh aspect of the present invention is a record medium for recording a control program that causes an inputting unit to input information representing time to a researching unit, the control program causing the inputting unit to perform the steps of (a) storing time information representing predetermined time corresponding to user's operation, (b) transmitting the time information representing the predetermined time stored at the storing step (a) to an external unit, and (c) inputting the time information representing the predetermined time to a searching unit, the searching unit searching information representing contents from a database corresponding to the time information representing the predetermined time at which contents were broadcast, the database correlatively storing the information representing the contents and broadcast time thereof.

A twelfth aspect of the present invention is a record medium for recording a control program that causes an inputting unit having a counter that operates with a predetermined clock signal and that inputs information representing time to a searching unit, the control program causing the inputting unit to perform the steps of (a) storing a count value of the counter at predetermined time corresponding to user's operation, (b) transmitting the count value stored at the storing step (a) to an external unit, and (c) inputting the information representing time to the searching unit, the searching unit searching information representing contents from a database corresponding to the information representing time at which contents were broadcast, the database correlatively storing the information representing the contents and broadcast time thereof.

A thirteenth aspect of the present invention is an inputting unit for inputting information representing time, comprising a counter that operates with a predetermined clock signal, a storing means for storing a count value of the counter at predetermined time corresponding to user's operation, a connecting portion for directly connecting the count value stored in the storing means to an external unit, and a communicating means for transmitting the count value stored in the storing means to the external unit through the connecting portion, wherein the information representing time is input to a searching unit through the external unit, the searching unit searching information representing contents from a database corresponding to the information representing time at which contents were broadcast, the database correlatively storing the information representing the contents and broadcast time thereof.

A fourteenth aspect of the present invention is an inputting unit for inputting information representing time, comprising a counter that operates with a predetermined clock signal, a storing means for storing a count value of the counter at predetermined time corresponding to user's operation, a displaying means for displaying the count value stored in the storing means, and a communicating means for transmitting the count value stored in the storing means to an external unit, wherein information representing time is input to a searching unit, the searching unit searching information representing contents from a database corresponding to the information representing time at which the contents were broadcast, the database correlatively storing the information representing the contents and broadcast time thereof.

A fifteenth aspect of the present invention is an inputting unit for inputting information representing time, comprising a counter that operates with a predetermined clock signal, a storing means for storing a count value of the counter at predetermined time corresponding to user's operation, a communicating means for transmitting the count value stored in the storing means to an external unit, and a sound generating means for generating a sound corresponding to the count value stored in the storing means, wherein information representing time is input to a searching unit, the searching unit searching information representing contents from a database corresponding to the information representing time at which the contents were broadcast, the database correlatively storing the information representing the contents and broadcast time thereof.

A sixteenth aspect of the present invention is an inputting unit for inputting information representing time, comprising a counter that operates with a predetermined clock signal, a first storing means for storing a count value of the counter at predetermined time corresponding to user's operation, an identification information generating means for generating predetermined identification information corresponding to the user's operation, a second storing means for storing the identification information generated by the identification information generating means, and a communicating means for transmitting the count value and the identification information stored in the first storing means and the second storing means to an external unit, wherein information representing time and identification information identifying contents are input to a searching unit, the searching unit searching information representing contents from a database corresponding to the information representing time at which the contents were broadcast, the database correlatively storing the information representing the contents and broadcast time thereof.

A seventeenth aspect of the present invention is an inputting unit for inputting information representing time, comprising a counter that operates with a predetermined clock signal, a first storing means for storing a count value of the counter at predetermined time corresponding to user's operation, a communicating means for communicating with an external unit and transmitting the count value stored in the first storing means to an external unit, and a second storing means for storing data transmitted from an external unit through the communicating means, wherein information representing time is input to a searching unit, the searching unit searching information representing contents from a database corresponding to the information representing time at which the contents were broadcast, the database correlatively storing the information representing the contents and broadcast time thereof.

An eighteenth aspect of the present invention is an inputting unit for inputting information representing time, comprising a storing means for storing time information representing predetermined time corresponding to user's operation, a displaying means for displaying the number of entries of the time information stored in the storing means, and a communicating means for transmitting the time information stored in the storing means to an external unit, wherein information representing time is input to a searching unit, the searching unit searching information representing contents from a database corresponding to the time information representing time at which the contents were broadcast, the database correlatively storing the information representing the contents and broadcast time thereof.

A nineteenth aspect of the present invention is an inputting unit for inputting information representing time, comprising a first storing means for storing time information representing predetermined time corresponding to user's operation, a communicating means for communicating with an external unit and transmitting the time information stored in the first storing means to the external unit, and a second storing means for storing data transmitted from the external unit through the communicating means, wherein information representing time is input to a searching unit, the searching unit searching information representing contents from a database corresponding to the time information representing time at which the contents were broadcast, the database correlatively storing the information representing the contents and broadcast time thereof.

A twentieth aspect of the present invention is an inputting unit for inputting information representing time, comprising a counter that operates with a predetermined clock signal, a storing means for storing a count value of the counter at predetermined time corresponding to user's operation, a sound generating means for generating a predetermined sound when the count value is stored to the storing means corresponding to the user's operation, and a communicating means for transmitting the count value stored in the storing means to an external unit, wherein information representing time is input to a searching unit, the searching unit searching information representing contents from a database corresponding to the information representing time at which the contents were broadcast, the database correlatively storing the information representing the contents and broadcast time thereof.

A twenty-first aspect of the present invention is an inputting method for an inputting unit having a counter that operates with a predetermined clock signal, the method comprising the steps of (a) storing a count value of the counter at predetermined time corresponding to user's operation, (b) directly connecting the count value stored at the storing step (a) to an external unit, and (c) transmitting the count value stored at the storing step (a) to the external unit connected at the connecting step (b), wherein information representing time is input to a searching unit through the external unit, the searching unit searching information representing contents from a database corresponding to time information representing time at which the contents were broadcast, the database correlatively storing the information representing the contents and broadcast time thereof.

A twenty-second aspect of the present invention is an inputting method for an inputting unit having a counter that operates with a predetermined clock signal, the method comprising the steps of (a) storing a count value of the counter at predetermined time corresponding to user's operation, (b) displaying the count value stored at the storing step (a), and (c) communicating the count value stored at the storing step (a) to an external unit, wherein information representing time is input to a searching unit, the searching unit searching information representing contents from a database corresponding to time information representing time at which the contents were broadcast, the database correlatively storing the information representing the contents and broadcast time thereof.

A twenty-third aspect of the present invention is an inputting method for an inputting unit having a counter that operates with a predetermined clock signal, the method comprising the steps of (a) storing a count value of the counter at predetermined time corresponding to user's operation, (b) transmitting the count value stored at the storing step (a) to an external unit, and (c) generating a sound corresponding to the count value stored at the storing step (a), wherein information representing time is input to a searching unit, the searching unit searching information representing contents from a database corresponding to time information representing time at which the contents were broadcast, the database correlatively storing the information representing the contents and broadcast time thereof.

A twenty-fourth aspect of the present invention is an inputting method for an inputting unit having a counter that operates with a predetermined clock signal, the method comprising the steps of (a) storing a count value of the counter at predetermined time corresponding to user's operation, (b) generating predetermined identification information corresponding to the user's operation, (c) storing the identification information generated at the identification information generating step (b), (d) transmitting the count value and the identification information stored at the first storing step (a) and the second storing step (c) to an external unit, wherein information representing time is input to a searching unit, the searching unit searching information representing contents from a database corresponding to time information representing time at which the contents were broadcast, the database correlatively storing the information representing the contents and broadcast time thereof.

A twenty-fifth aspect of the present invention is an inputting method for an inputting unit having a counter that operates with a predetermined clock signal, the method comprising the steps of (a) storing a count value of the counter at predetermined time corresponding to user's operation, (b) communicating with an external unit and transmitting the count value stored at the first storing step (a) to the external unit, and (c) storing the data transmitted from the external unit at the communicating step (b), wherein information representing time is input to a searching unit, the searching unit searching information representing contents from a database corresponding to time information representing time at which the contents were broadcast, the database correlatively storing the information representing the contents and broadcast time thereof.

According to searching system and searching method of the present invention, in an inputting unit, information representing at least time at which contents were broadcast is stored in a storing means by a predetermined operation. The information is transmitted to the outside. A searching unit searches information representing contents from the storing means corresponding to information representing time. The storing means correlatively stores information representing contents and broadcast time thereof. A terminal unit receives information representing time from the inputting unit and transmits the information to the searching unit. Search results are supplied from the searching unit to the terminal unit. The terminal unit displays the information representing time received from the inputting unit and the search results received from the searching unit. Thus, information representing time at which contents were broadcast is input from the inputting unit. The information representing time is transmitted to the searching unit. The searching unit searches information representing the contents corresponding to the information representing time. The terminal unit displays the information representing the contents.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 17 is a schematic diagram showing another modification of the book marker;

FIG. 28 is a block diagram showing an example of the structure of a searching system according to a second embodiment of the present invention; and FIG. 29 is a schematic diagram showing a money flow that takes place according to the second embodiment of the present invention.

DETAILED DESCRIPTION OF THE PREFERRED EMBODIMENTS

Figure 1:
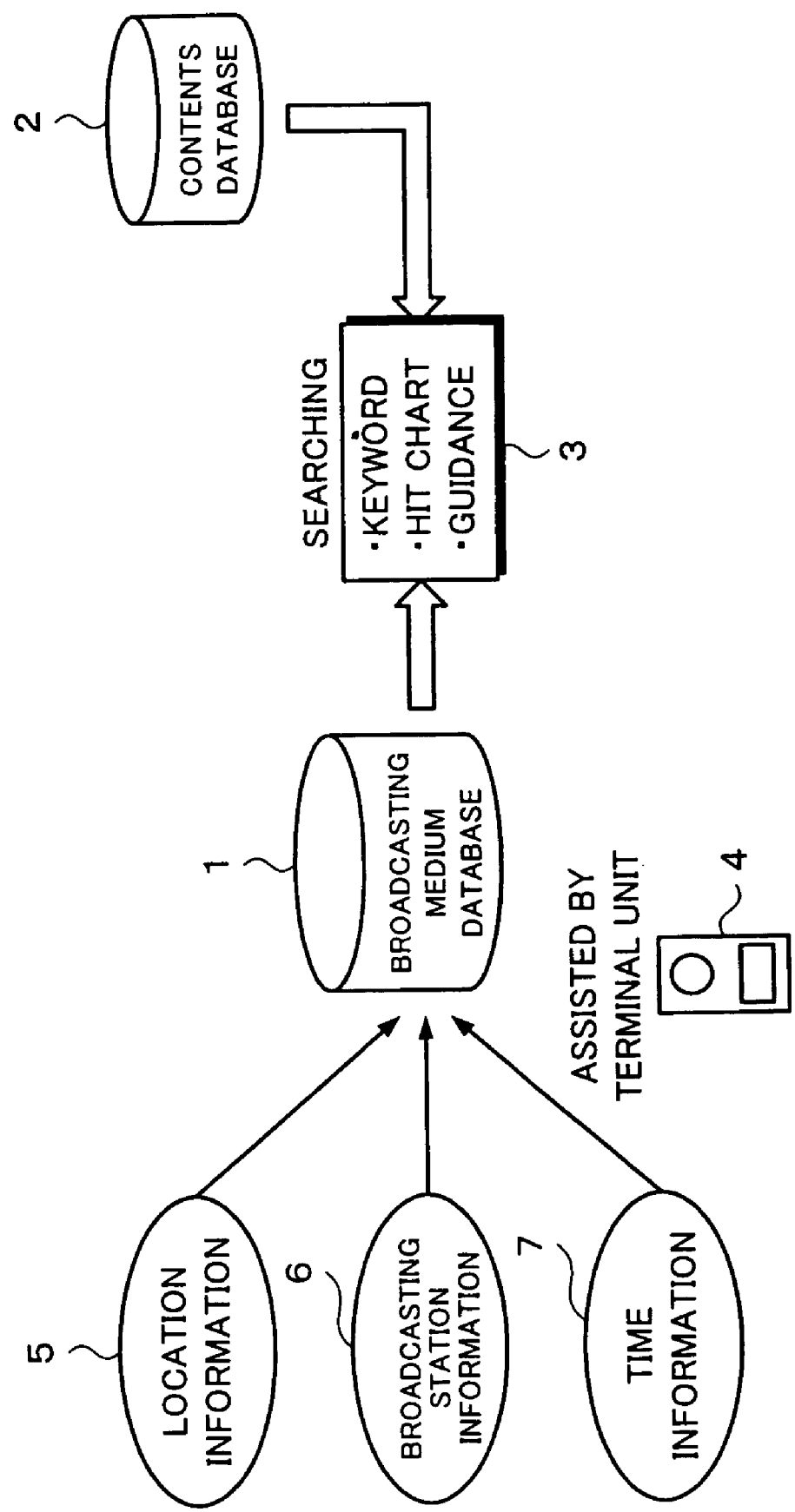
FIG. 1 is a schematic diagram showing the structure of an information searching system according to the present invention.

Next, the present invention will be described in detail. First of all, an outline of the present invention will be described. FIG. 1 shows an outlined structure of an information searching system according to the present invention. Referring to FIG. 1, the information searching system comprises two databases 1 and 2, a search engine 3, and an auxiliary terminal unit 4. The search engine 3 searches the databases 1 and 2. The auxiliary terminal unit 4 assists the user for search conditions.

The database 1 stores information about contents that were broadcast from broadcasting mediums such as radio broadcasting stations. The database 1 correlatively stores musical piece names that were broadcast from radio broadcasting stations, time information representing time at which these musical pieces were broadcast, and broadcasting station information representing the broadcasting stations that broadcast these musical pieces. The database 1 may store information about contents of other broadcasting mediums. The contents may be commodity information as well as musical pieces.

The database 1 correlatively stores musical piece names and additional information thereabout. The additional information about each musical piece is composed of for example a music CD number, CD title information, information of a performer and a composer, the words, a guidance, and so forth. The additional information of each musical piece may be stored to another database that can be searched from the search engine 3.

In this example, it is assumed that the broadcasting medium is a radio broadcasting station and that contents provided by the broadcasting medium are musical pieces.

The database 2 stores information about contents stored in the database 1. When contents are musical pieces that were broadcast from a broadcasting medium, information about contents (for example, an album (CD) name, performer information, a seller, and a released date) is correlated with musical piece names and stored. The database 2 can also store customer information of the system. The database 2 stores customer ID information unique to each auxiliary terminal unit 4 (that will be described later) and other information about each customer.

The search engine 3 searches information from the database 1 corresponding to a search condition designated by the user. In this example, the engine represents a structure of a block that provides the user with a particular function. The search engine 3 provides the user with a particular searching function.

When the user likes a musical piece that was broadcasted from a radio broadcasting station, if he or she knows the radio broadcasting station, the location, and the broadcast time, he or she designate location information 5, broadcasting station information 6, and time information 7 as search conditions to the search engine 3. The search engine 3 searches the database 1 corresponding to the designated search conditions and outputs for example a musical piece name as the search results. In addition, the search engine 3 searches the database 2 using the musical piece name as a search condition and outputs an album name, a seller name, performer name information, and so forth of the musical piece. The search results of the database 2 are supplied to the user.

On the other hand, when the user wants to search a desired musical piece that was broadcast from a radio broadcasting station, he or she may not know the information 5, 6, and 7 or ambiguously knows them. However, according to the present invention, the user has the auxiliary terminal unit 4 that can obtain time information 7. In addition, the location information 5 and the broadcasting station information 6 of the user are pre-stored as customer information to the database 2.

In other words, when the user likes a musical piece that was broadcast, he or she operates the auxiliary terminal unit 4 so as to store time information 7' at which the musical piece was broadcast. Thereafter, the user causes the search engine 3 to search a musical piece corresponding to the time information 7'. The search engine 3 searches the database 1 corresponding to the time information 7', the location information 5, and the broadcasting station information 6 (the information 5 and 6 have been stored in the database 2). The search engine 3 searches the database 2 corresponding to a musical piece name obtained as the search results. The search results are supplied as alternatives of user's desired information to the user.

According to the system of the present invention, when the user likes a musical piece that was broadcast, he or she can obtain desired information by causing the auxiliary terminal unit 4 to store the time information 7'.

Figure 2:
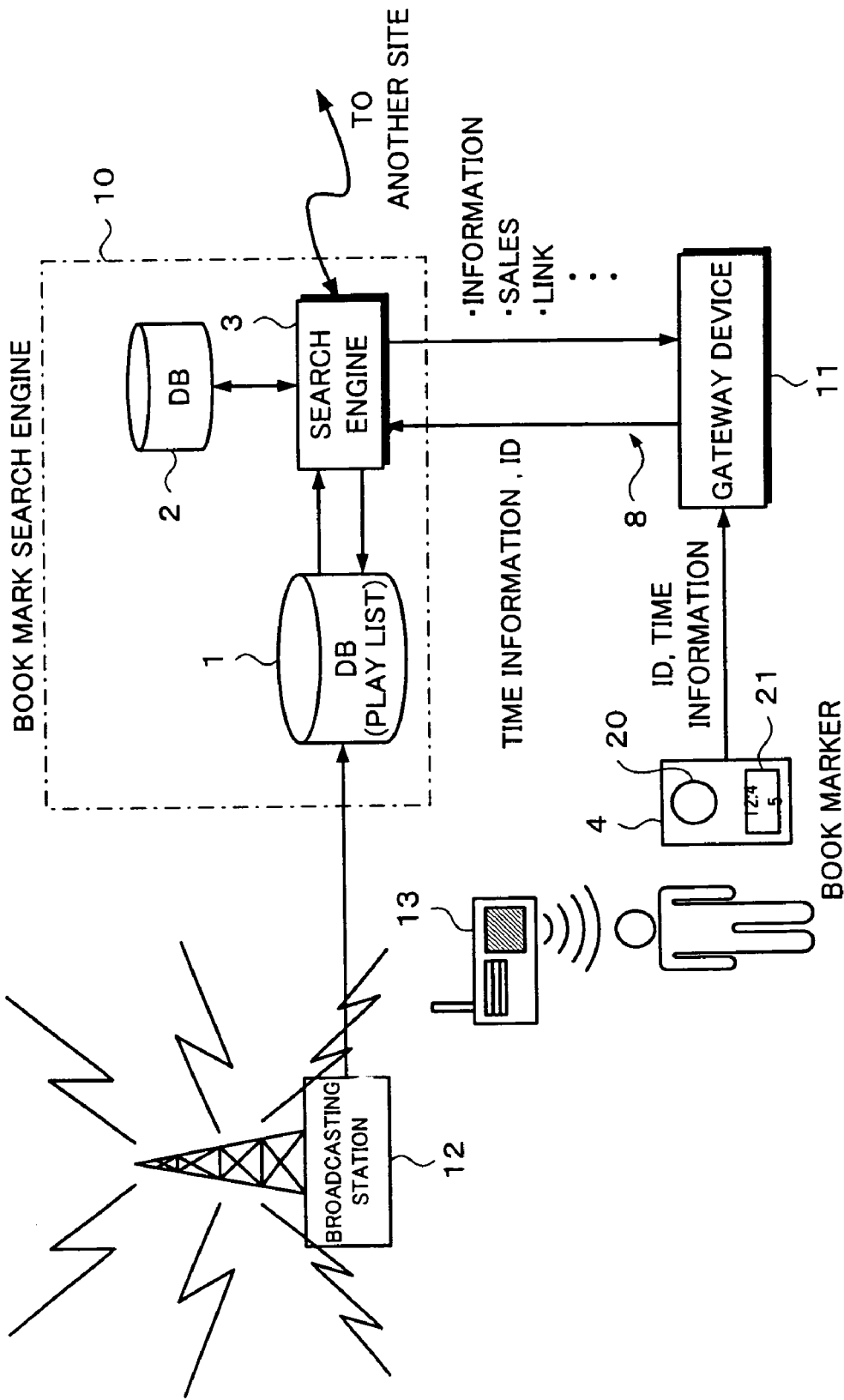
FIG. 2 is a schematic diagram showing an example of the structure of a musical piece data searching system according to a first embodiment of the present invention.

Next, a first embodiment of the present invention will be described. FIG. 2 shows an example of the structure of a musical piece data searching system. In FIG. 2, similar portions to those in FIG. 1 are denoted by similar reference numerals and their description is omitted. The database 1, the database 2, and the search engine 3 compose a book mark search engine 10. The book mark search engine 10 is connected to another web site (not shown) through a communication line such as Internet.

A web site is a place from which information is published to the network. The book mark search engine 10 is one web site. For example, the book mark search engine 10 is connected to a database (not shown) as another web site. The location of a web site is represented with address information referred to as URL (Uniform Resource Locator).

A broadcasting station 12 is for example a radio broadcasting station. The broadcasting station 12 broadcasts for example musical pieces as contents corresponding to a pre-created play list. The play list may be created after the contents were broadcast. Information such as commodity information other than musical pieces may be broadcast as contents. The broadcasting station 12 may be a television broadcasting station that wirelessly or non-wirelessly broadcasts TV program, a CATV (Cable Television), or a non-wireless broadcasting station that mainly broadcasts musical pieces.

Figures 3, 4:
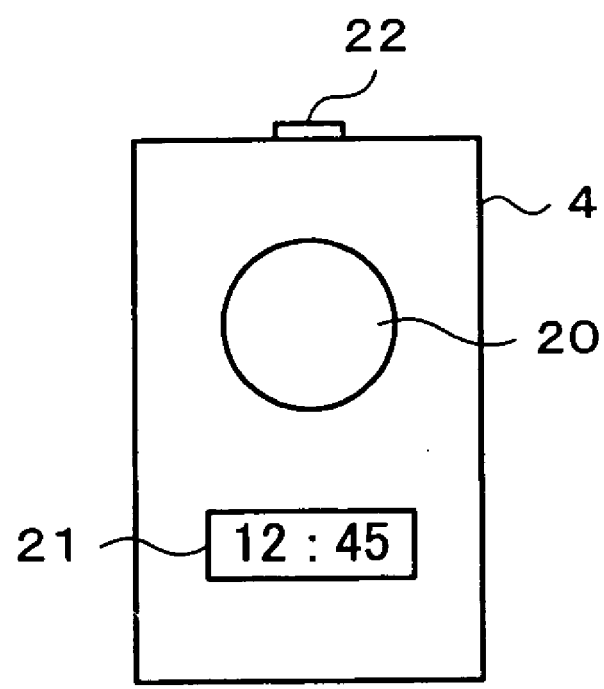
FIG. 3 is a schematic diagram showing an example of a play list.
FIG. 4 is a schematic diagram showing an example of the appearance of an auxiliary terminal unit (for example, a book marker) according to the first embodiment of the present invention.

The book mark search engine 10 and the broadcasting station 12 are connected through a communication line such as Internet. The above-described play list is transmitted from the broadcasting station 12 to the book mark search engine 10. The book mark search engine 10 stores the received play list to the database 1. FIG. 3 shows an example of a play list. In the example shown in FIG. 3, for example one musical piece as contents that was broadcast is correlated with the name of the broadcasting station 12 that broadcast the contents (Station Name), the broadcasting area of the broadcasting station 12 (Area), the broadcast start time of the contents (musical pieces) (Start Time), the broadcast end time of the contents (End Time), and the contents name (Content).

A play list stored in the database 1 is not always transmitted from the broadcasting station 12. In other words, a play list may be manually created using information of broadcast programs. The created play list may be stored to the database 1 through a predetermined storage medium. Alternatively, a play list may be created by another system other than a broadcasting station and transmitted to the book mark search engine 10. The database 1 can store a plurality of play lists of different broadcasting stations in such a manner that they are identified.

The book mark search engine 10 and a gateway device 11 are bidirectionally connected through a communication line 8 such as Internet. As will be described later, the gateway device 11 is for example a personal computer. The gateway device 11 can bidirectionally communicate with the book mark search engine 10. In addition, the gateway device 11 can communicate with the auxiliary terminal unit 4 that the user has.

The gateway device 11 is not limited to a personal computer. For example, the gateway device 11 may be a set top box used to connect a television receiver and a digital network. As another example, the gateway device 11 may be an IRD (Integrated Receiver Decoder) that is a digital broadcasting receiver. In addition, the gateway device 11 is not limited to a device that can be used by individuals. For example, an information terminal unit that is installed as a public terminal unit in a retail store may be used as the gateway device 11.

FIG. 4 shows an example of the appearance of the auxiliary terminal unit 4 according to the first embodiment of the present invention. Hereinafter, the auxiliary terminal unit 4 is referred to as book marker 4. The book marker 4 has an inputting portion 20 and a displaying portion 21. The inputting portion 20 is composed of for example buttons. The displaying portion 21 displays the current time. In addition, the book marker 4 has a connector 22 that is an electric connecting point used to communicate with the gateway device 11.

The book marker 4 is simply structured as will be described later. For example, the book marker 4 may be contained in a small case that can be used as a key holder. As another example, the book marker 4 may be built in various types of electronic devices. As will be described later, the book marker 4 may be built in a radio receiver. In addition, the book marker 4 may be built in a car stereo system of an automobile. Of course, the book marker 4 may be built in other than electronic devices. The book marker 4 may be preferably built in a portable device or a device that can be portably used.

Figures 5, 6:
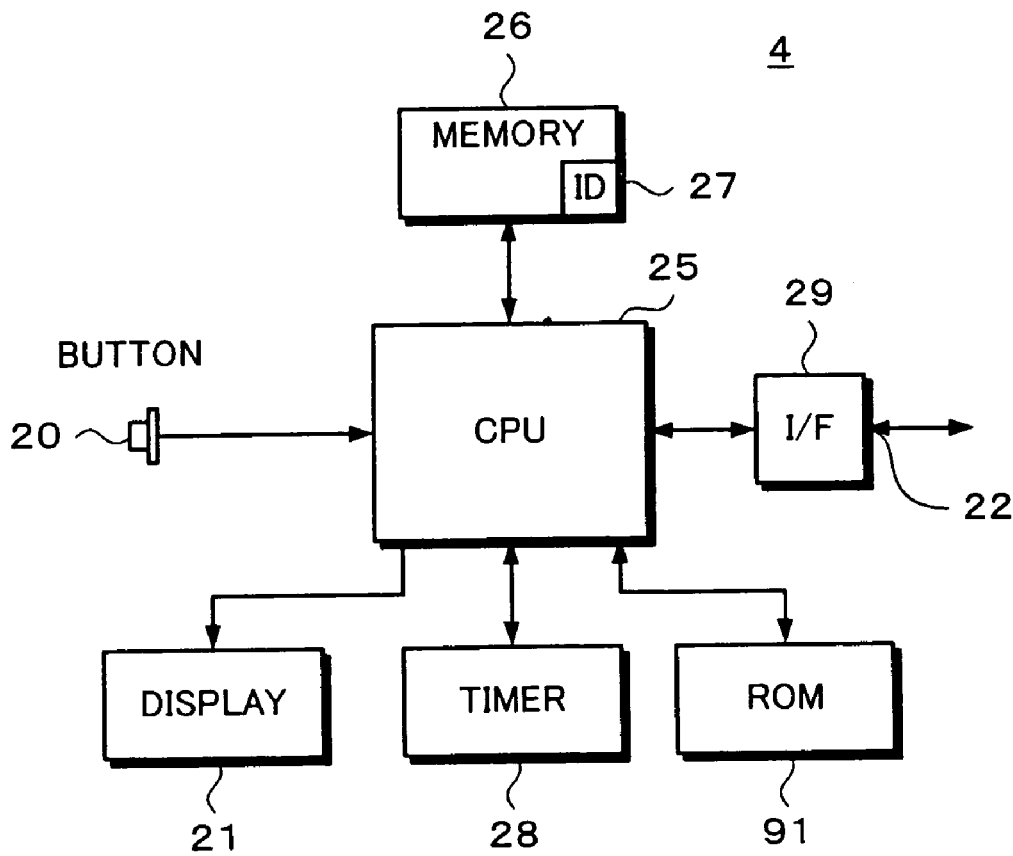
FIG. 5 is a block diagram showing an example of the structure of the book marker according to the first embodiment of the present invention.
FIG. 6 is a schematic diagram showing an example of time information stored in a memory of the book marker.

FIG. 5 shows an example of the structure of the book marker 4 according to the first embodiment of the present invention. In FIG. 5, a CPU (Central Processing Unit) 25 has a memory, a bus, a particular interface, and so forth (that are not shown). A button 20, a displaying portion 21, a memory 26, a timer 28, an interface 29, and a ROM (Read Only Memory) 91 are connected to the CPU 25. The timer 28 outputs the current time. Under the control of the CPU 25, the current time can be adjusted. The displaying portion 21 is composed of for example an LCD (Liquid Crystal Display). The displaying portion 21 is controlled by the CPU 25. Time information is supplied from the timer 28 to the displaying portion 21 under the control of the CPU 25. The displaying portion 21 may be omitted.

The ROM 91 pre-stores a program that causes the book marker 4 to be controlled. The CPU 25 controls the operation of the book marker 4 corresponding to the program stored in the ROM 91. The CPU 25 controls the operations of the displaying portion 21, the button 20, the communication through the interface 29, the access control of the memory 26, and so forth.

The CPU 25 detects the operation of the button 20 performed by the user. Time information at which the button 20 is operated is stored to the memory 26 corresponding to the output of the timer 28. As shown in FIG. 6, a plurality of entries of time information can be stored to the memory 26. Each entry of time information is assigned to a unique sequence number. A terminal ID 27 is stored at a particular area of the memory 26. The terminal ID 27 is a unique ID that identifies the book masker 4.

In the above-described example, information stored in the memory 26 corresponding to the operation of the button 20 is time information and identification information that identifies each entry of the time information. However, the present invention is not limited to such an example. In other words, time information and category information thereof can be stored to the memory 26. When the user operates the button 20, the CPU 25 determines whether the user momentarily presses the button 20 once, presses the button 20 twice in a predetermined time period, or continuously presses the button 20 for a predetermined time period or longer. Corresponding to the detected results, the CPU 25 generates category information and stores the category information, the identification information, and the time information to the memory 26.

For example, when the user momentarily presses the button 20 once, the CPU 25 determines that he or she has operated the book marker 4 for a radio broadcast. When the user presses the button 20 twice in a predetermined time period, the CPU 25 determines that he or she has operated the book marker 4 for a television broadcast. When the user continuously presses the button 20 for a predetermined time period or longer, the CPU 25 determines that he or she has operated the book marker 4 for an out-of-area. The CPU 25 generates a flag corresponding to the category information. The flag, the time information, and the identification information are correlatively stored in the memory 26.

The interface 29 controls a communication with the outside of the connector 22 (namely, with the gateway device 11). The interface standard of the interface 29 that communicates with the gateway device 11 is not limited. For example, USB (Universal Serial Bus) can be used as an interface standard for a communication between the book marker 4 and the gateway device 11. Alternatively, an interface standard defined as IEEE-1394 may be used. In addition, RS-232C may be used as an interface standard for a communication between the book marker 4 and the gateway device 11.

In addition, as was described above, the communication interface is not limited to a non-wireless interface. For example, using an infrared ray signal corresponding to IrdA (Infrared Data Association) interface standard, a communication can be made between the book marker 4 and the gateway device 11. In this case, each of the connector 22 and the interface 29 should have transmitting/receiving functions for an infrared ray signal.

In addition, the book marker 4 may be structured as an IC card having an IC (Integrated Circuit) and a communicating means or a PC card corresponding to PCMCIA (Personal Computer Memory Card International Association) standard or JEIDA (Japan Electronic Industry Development Association) standard. When the book marker 4 is structured as an IC card, an interface standard corresponding to the IC card is used as the interface 29. When the book marker 4 is structured as a PC card, a connector corresponding to the PC card is used for the gateway device 11. When the book marker 4 as a PC card is directly attached to the connector corresponding to the PC card, a communication can be made between the book marker 4 and the gateway device 11.

The terminal ID 27 stored in the memory 26 and the time information can be read from the memory 26 and output to the outside through the interface 29 under the control of the CPU 25.

Figure 7:
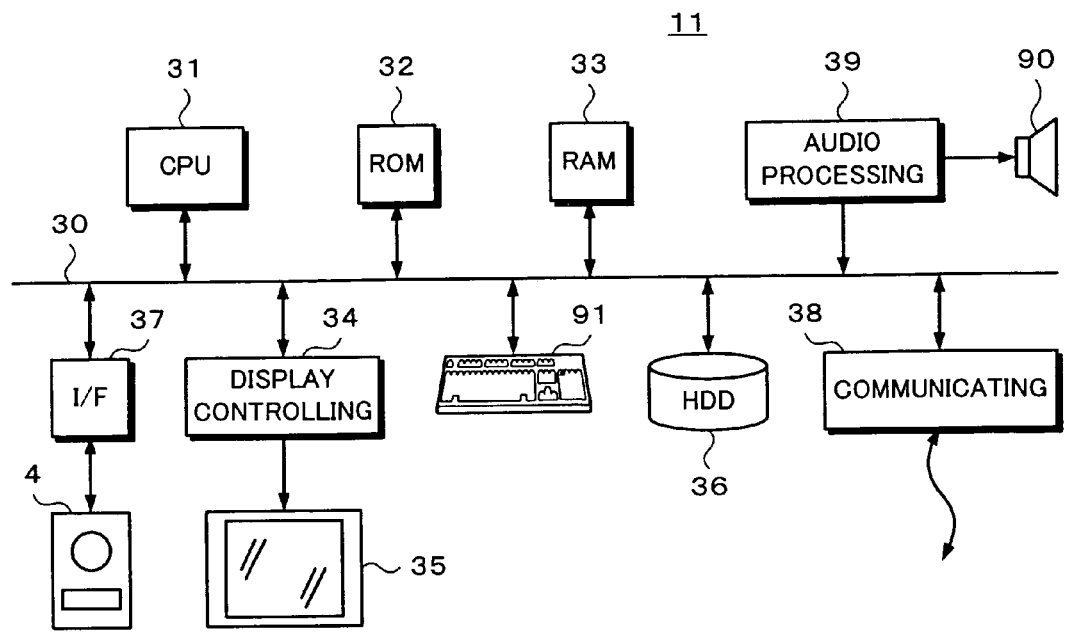
FIG. 7 is a block diagram showing an example of the structure of a gateway device.

FIG. 7 shows an example of the structure of the gateway device 11. As was described above, the gateway device 11 may be a conventional personal computer. In FIG. 7, a conventional personal computer is used as the gateway device 11. Referring to FIG. 7, a CPU 31, a ROM (Read Only Memory) 32, a RAM (Random Access Memory) 33, a display controlling circuit 34, and a storage medium (for example, a hard disk 36) are connected to a bus 30. In addition, an inputting means 91 that outputs a control signal corresponding to user's operation is connected to the bus 30. The inputting means 91 is composed of for example a keyboard and a predetermined pointing device (such as a mouse). The CPU 31 operates corresponding to a program stored in the ROM 32 and the hard disk 36. Corresponding to user's operation against the inputting means 91, the CPU 31 performs a predetermined operation. The RAM 33 is used as a work memory of for example the CPU 31. A display control signal that is output from the CPU 31 is supplied to the display controlling circuit 34. The display controlling circuit 34 causes a display 35 to display data corresponding to a display control signal.

In addition, an interface 37 that communicates with the book marker 4 is connected to the bus 30. The interface 37 complies with an interface standard corresponding to the interface 29 of the book marker 4 (for example, USB, IEEE-1394, RS-232C, IrDA, or the like).

In addition, a communicating means 38 is connected to the bus 30. The communicating means 38 communicates with the book mark search engine 10 through the communication line 8. The communicating means 38 is for example a modem. The communicating means 38 is connected to a public telephone line as the communication line 8. The gateway device 11 is connected to Internet with for example a modem through the public telephone network. In addition, the gateway device 11 can bidirectionally communicate with the book mark search engine 10 through Internet.

An audio processing means 39 is connected to the bus 30. The audio processing means 39 converts digital audio data supplied through the bus 30 into an analog audio signal. The analog audio signal that is output from the audio processing means 39 is reproduced by for example a speaker 90.

As was described above, the user should preregister his or her information to the database 2 of the book mark search engine 10. The user information can be registered using the gateway device 11. First of all, the user connects the book marker 4 to the gateway device 11 through a predetermined interface. The user operates the gateway device 11 so as to register himself or herself and the book marker 4 to the customer database 2.

Figure 8:
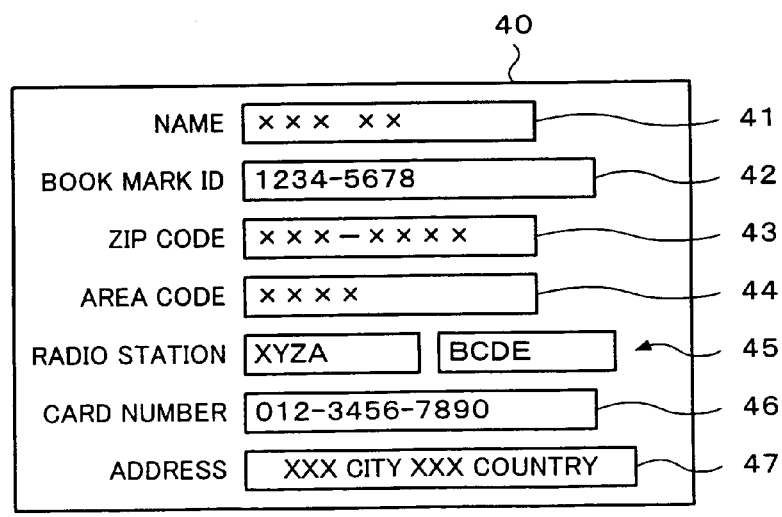
FIG. 8 is a schematic diagram showing a registration screen of the gateway device, the registration screen being used to register a user and a book marker that the user has.

FIG. 8 shows an example of fields on a registration screen 40 of the display 35 in the case that the user registers himself or herself and his/her book marker 4 to the customer database 2. A "name" field 41 is used to input the name of the user. A "book mark ID" field 42 is used to input the terminal ID 27 of the user's book marker 4.

The above-described terminal ID 27 is input by a communication between the gateway device 11 and the book marker 4. In other words, a request for the terminal ID 27 is transmitted from the gateway device 11 to the book marker 4. The book marker 4 reads the terminal ID 27 from the memory 26 under the control of the CPU 25 corresponding to the request. The terminal ID 27 is transmitted to the gateway device 11. The gateway device 11 causes the display 35 to display the received terminal ID 27 at the "book mark ID" field 42. In addition, the gateway device 11 causes the RAM 33 to store the received terminal ID 27.

A "zip code" field 43 and a "area code" field 44 are used to input the zip code and the area code of the public telephone line of the user. Corresponding to the contents that was input to the fields 43 and 44, the user's area is represented. With respect to the user's area, information that represents a geographical area can be input instead of the zip code and the area code. Alternatively, an area name that was designated may be input. A "radio station" field 45 is used to input information that identifies user's favorite radio station. In this example, although a broadcasting station name was input, a frequency band of a radio broadcasting station may be input.

A "card number" field 46 is used to input user's credit card number, user's bank card number, or the like. An "address" field 47 is used to accurately input the user's address. These fields are used when a service using the book marker 4 requires a charging process.

Each piece of information that is input to the fields 41 to 47 is stored to the RAM 33. The information is read from the RAM 33 corresponding to a predetermined operation. The information that is read from the RAM 33 is transmitted to the book mark search engine 10 by the communicating means 38. At this point, each information to be transmitted is preferably encrypted corresponding to a predetermined encrypting method.

On the other hand, the timer 28 is adjusted by the book marker 4. For example, when the terminal ID 27 is registered, the book marker 4 and the gateway device 11 are connected. At this point, the book marker 4 and the gateway device 11 are bidirectionally communicated. Using time information that is output from a timer (not shown) of the gateway device 11, the timer 28 of the book marker 4 can be adjusted.

Such a process can be performed by a uni-directional communication from the book marker 4 to the gateway device 11. In this case, the book marker 4 and the gateway device 11 are connected. The terminal ID 27 is transmitted from the book marker 4 to the gateway device 11. In addition, time information of the timer 28 is transmitted from the book marker 4 to the gateway device 11. The gateway device 11 compares the transmitted time information with time information represented by the timer (not shown) of the gateway device 11. Corresponding to the difference, the correct time may be calculated.

In these cases, the time information of the timer (not shown) of the gateway device 11 should be adjusted to correct time by a proper manner.

In the above-described example, the book marker 4 has a timer. However, it should be noted that the present invention is not limited to such an example. In other words, a counter that operates with a clock signal having a predetermined period may be disposed in the book marker 4. Corresponding to the count value of the counter, time information that represents the time at which the button 20 was pressed can be obtained. For example, the count value at which the user pressed the button 20 is stored to the memory 26. When the book marker 4 is connected to the gateway device 11 and the count value stored in the memory 26 is transmitted to the gateway device 11, the count value at which the count value was transmitted is also transmitted to the gateway device 11 in addition to the count value that was read from the memory 26.

On the other hand, the gateway device 11 adjusts the timer (not shown) in a predetermined manner and obtains a master clock. For example, the communicating means 38 communicates with the book mark search engine 10 through the communication line 8, obtains time information, and adjusts the timer of the gateway device 11 corresponding to the time information. In addition, a predetermined receiving means may be disposed in the gateway device 11. The receiving means may receive time information contained in a television broadcast or a radio broadcast. Corresponding to the received time information, the timer of the gateway device 11 may be adjusted.

The gateway device 11 obtains the difference between the count value at which the user pressed the button 20 and the count value at which time information was transmitted from the book marker 4. When the count up period of the counter of the book marker 4 is known, the time is traced back from the time at which time information was transmitted from the book marker 4 by the count value of the difference corresponding to the timer of the gateway device 11. Thus, the time at which the user pressed the button 20 of the book marker 4 and the count value was stored to the memory 26 can be accurately obtained.

According to this method, it is not necessary to dispose a clock (timer 28) and the displaying portion 21 that displays time in the book marker 4. This method is preferable because it is not necessary to adjust the timer 28 of the book marker 4.

When the book marker 4 is provided with a counter instead of a timer, the count value of the counter corresponds to time information.

In the case that the book marker 4 is connected to the gateway device 11, when the gateway device 11 measures the count value of the counter of the book marker 4 at an interval of a predetermined time period, the period of the counter of the book marker 4 can be obtained.

In the above-described example, the counter counts with a clock signal having a predetermined period. However, it should be noted that the present invention is not limited to such an example. When the counter value is correlated with the counter start time, the counter can be operated with a clock signal that is generated at any timing. For example, the counter may be operated with an M sequence clock signal generated by a shift register and an exclusive-OR circuit. Alternatively, by periodically varying the period of a clock signal, the counter can be accomplished. Of course, the gateway device 11 should know the type of the counter used in the book marker 4. When such a clock signal is used for the counter, the book marker 4 can be prevented from illegally being fabricated or used.

In the above-described example, the time at which the button 20 was pressed on the book marker 4 is obtained with the gateway devise 11. However, it should be noted that the present invention is not limited to such an example. In other words, the gateway device 11 obtains first time information that represents the time at which the button 20 was pressed on the book marker 4 and second time information that represents the time at which the first time information was transmitted from the book marker 4 to the gateway device 11, transmits the first time information and the second time information to the book mark search engine 10, and obtains the accurate time at which the button 20 was pressed corresponding to the master clock of the book mark search engine 10.

The timer 28 of the book marker 4 or the above-described counter may operate as a stop watch. In other words, when the button 20 is operated, the timer 28 or the counter starts counting. Thus, when time information (or count value) is transmitted from the book marker 4 to the gateway device 11, the timer 28 or the counter is reset and stopped. When the button 20 is operated next time, the timer 28 or the counter starts operating. In such a manner, the power consumption of the book marker 4 can be reduced.

Figure 9:
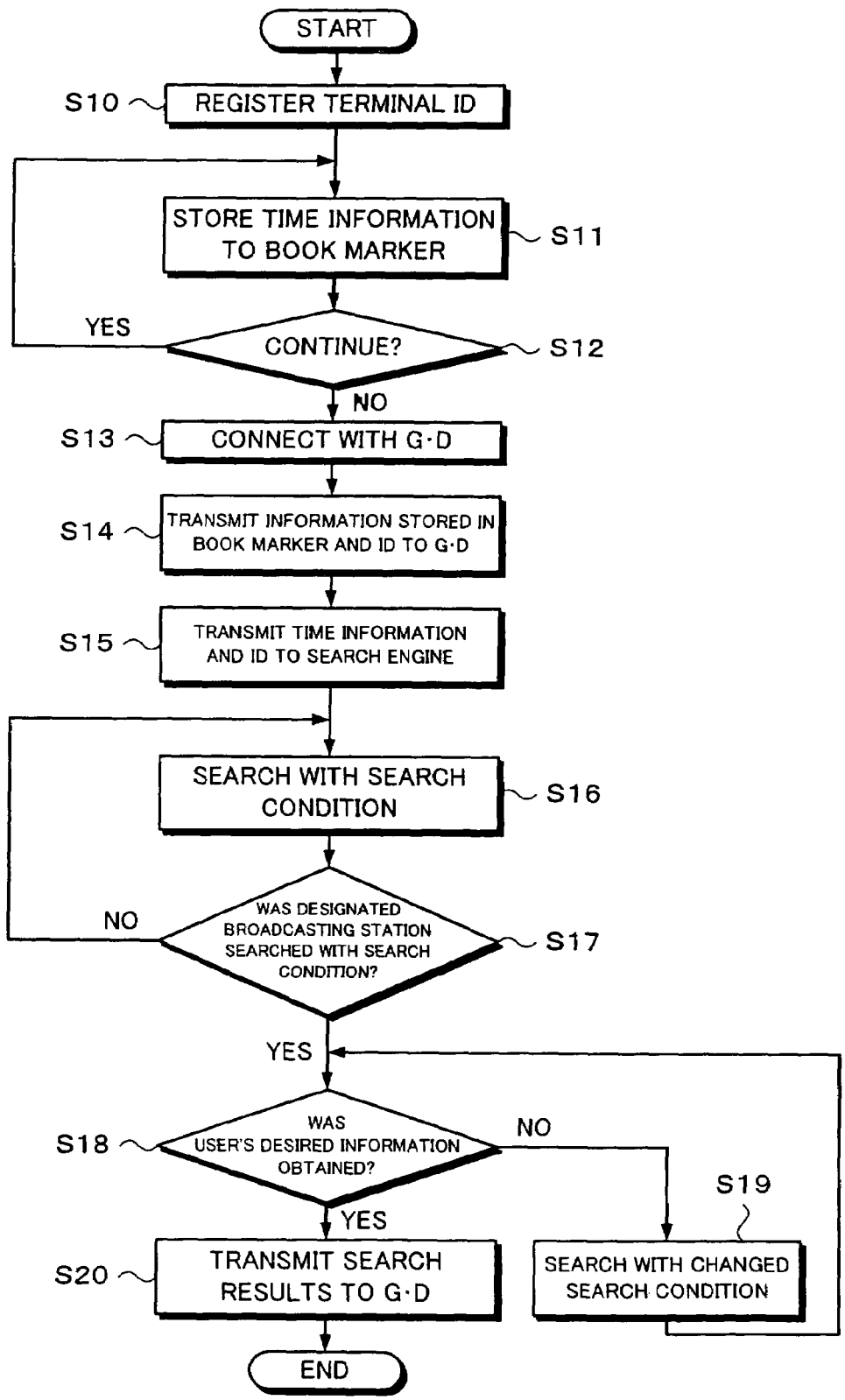
FIG. 9 is a flow chart showing an example of a contents searching process according to the present invention.

Next, with reference to a flow chart shown in FIG. 9, the contents searching process of the system shown in FIG. 2 will be described. First of all, at step S10, in the above-described manner, the terminal ID 27 of user's book marker 4 is registered to the book mark search engine 10.

The user can store time information to the book marker 4 with the terminal ID 27 at any place (for example, on the street or in the car). When the user likes a musical piece that he or she is listening on the radio, he or she presses the button 20 of the book marker 4. Time information at which the button 20 was pressed is stored to the memory 26 of the book marker 4 (at step S11). A plurality of entries of time information can be stored to the memory 26 of the book marker 4 as long as it has a free space (at step S12).

At step S13, the book marker 4 and the gateway device 11 (abbreviated as G.D in FIG. 9) are connected. At step S14, time information stored to the memory 26 of the book marker 4 is read along with the terminal ID 27. The time information is transmitted to the gateway device 11 through a predetermined interface. At step S14, the transmitting process is automatically performed after the book marker 4 and the gateway device 11 are connected. At step S15, the time information and the terminal ID 27 that were transmitted from the book marker 4 to the gateway device 11 are transmitted to the book mark search engine 10 through the communication line 8.

At step S16, the book mark search engine 10 searches information corresponding to the time information and the terminal ID 27 transmitted from the gateway device 11. As a search condition, time information is used. When the user wants to know musical piece information, it is searched from the database 1 corresponding to the time information. Corresponding to play lists of broadcasting stations stored in the database 1, musical piece names of musical pieces that were broadcasted from the radio broadcasting stations at the time represented by the time information are output.

When the searching process is performed at step S16, the search condition is narrowed corresponding to the user's information registered at step S10. Corresponding to the terminal ID 27 transmitted from the gateway device 11, the database 2 is searched. As a result, the user's registration information as the terminal ID 27 is output. The registration information is used as another search condition.

At this point, only a play list of a particular broadcasting station is searched from the database 1 corresponding to broadcasting station information that was input in the "radio station" field 45 when the terminal ID 27 was registered to the book mark search engine 10 at step S10.

After the play list was searched (at step S17), the search results are supplied to the user. In other words, the search results of the book mark search engine 10 are transmitted to the gateway device 11. The gateway device 11 displays the transmitted search results on a display screen (that will be described later). Thus, the user can know whether or not user's desired information was obtained (at step S18).

When the search results do not contain user's desired information, a relevant message is transmitted from the gateway device 11 to the book mark search engine 10. At step S19, with a changed search condition, the database 1 is searched. For example, as a search condition, broadcasting stations are searched corresponding to information that was input in the "zip code" field 43 and the "area code" field 44. Alternatively, broadcasting stations may be searched corresponding to adjacent areas of the area represented by the fields 43 and 44.

When the database 1 is searched again at step S19, a search condition may be automatically designated by the book mark search engine 10. For example, at step S10, the bookmark search engine 10 may designate information registered by the user as a search condition one after the other. When the database 1 is searched again, the user may designate a search condition. In this case, the user inputs a new search condition to the gateway device 11. The input search condition is transmitted from the gateway device 11 to the book mark search engine 10.

When user's desired information was searched, the flow advances to step S20. At step S20, the searched information is transmitted from the book mark search engine 10 to the gateway device 11. When information about a musical piece is searched, audio data of the searched musical piece is transmitted from the book mark search engine 10 to the gateway device 11. Audio data of musical pieces can be stored to the database 2. Alternatively, the user can request another web site connected to for example Internet to transmit audio data of a musical piece.

The user can cause the hard disk 36 of the gateway device 11 to store received audio data and the audio processing means 39 and the speaker 90 to reproduce the audio data. When the user likes the reproduced musical piece, he or she can cause the gateway device 11 to communicate with the book mark search engine 10 and request to purchase an album (CD) that contains the musical piece.

Figure 10:
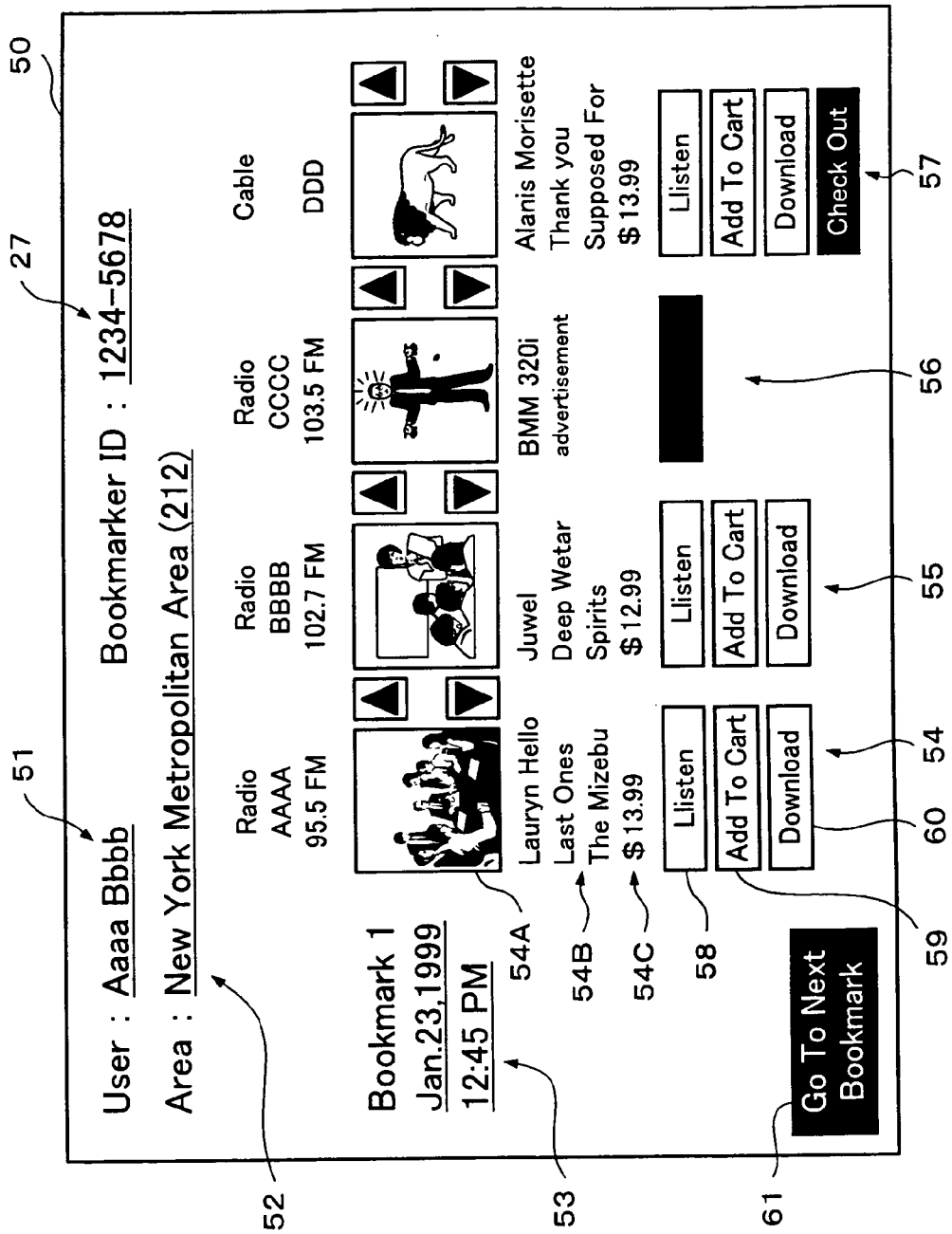
FIG. 10 is a schematic diagram showing an example of a display screen of the gateway device according to the first embodiment of the present invention.

FIG. 10 shows an example of a screen of the gateway device 11 (this screen is displayed at and after step S18). At upper positions of the screen, a user name 51, a terminal ID 27, and an area 52 appear as user's registered information. The area 52 is omitted as an input field on the registration screen shown in FIG. 8. In the example shown in FIG. 10, three radio broadcasting stations "AAAA", "BBBB", and "CCCC" and one CATV (Cable Television) broadcasting station "DDD" have been registered.

Search results of four broadcasting stations by the book mark search engine 10 corresponding to one entry of time information 53 registered to the book marker 4 appear as search results 54, 55, 56, and 57. In this example, musical pieces were broadcast from the broadcasting stations "AAAA", "BBBB", and "DDD" at the time represented by the time information 53. On the other hand, an advertisement was broadcast from the broadcasting station "CCCC" at the time represented by the time information 53. For example, the search result 54 for the broadcasting station "AAAA" contains a CD jacket image 54A, a program name—singer name 54B, and a CD sales price 54C. The CD jacket image 54A appears below a broadcasting station name and broadcasting frequency band information. The CD jacket image 54A shows a jacket image of a CD that contains a musical piece that was broadcast at the time represented by the time information 53 from the broadcasting station "AAAA".

Below the CD sales price 54C, buttons 58, 59, and 60 appear as virtual operation buttons operated with a user interface of the gateway device 11. The buttons 58, 59, and 60 are in common with each broadcasting station that broadcast musical pieces. When the user operates the button 58, audio data of the musical piece is transmitted from the book mark search engine 10 to the gateway device 11. The audio data is processed by the audio processing means 39 and then reproduced from the speaker 90. When the user operates the button 58, the transmitted audio data is not stored to a predetermined storing device (for example, the hard disk 36).

With reference to the jacket image 54A, the musical piece name—singer name 54B, the audio data of the musical piece, and so forth, the user can select a desired musical piece from those that were broadcast from the registered broadcasting stations.

The button 59 is used when the user wants to purchase a CD that contains a desired musical piece. The button 60 is used to download and store audio data of a desired musical piece to for example the hard disk 36. When the user purchases a CD or downloads audio data using the button 59 or 60, the fee of the CD or audio data is charged to the credit card or bank card corresponding to the information that was input to the "card number" field 46 shown in FIG. 8.

In the example shown in FIG. 10, the buttons 58, 59, and 60 do not appear for the advertisement that was broadcast from the broadcasting station "CCCC". Alternatively, a button that allows the user to purchase a commodity item of the advertisement may be additionally placed.

When there are many registered broadcasting stations, search results may not appear at a time. In this case, by operating a button 61, information of other registered broadcasting stations appears.

In the above-described example, the book marker 4 was described as a dedicated device that stores time information. However, it should be noted that the present invention is not limited to such an example. For example, a portable communication device such as a portable telephone unit or a PHS (Personal Handy Phone System) unit may be provided with the function of the book marker 4. The button 20 can be disposed on the device along with dial keys and so forth. The telephone number of the device can be used as the terminal ID 27. In a combination of the dial keys, the function of the button 20 can be accomplished. Likewise, a GPS (Global Positioning System) may be provided with the function of the book marker 4. When a device such as a PHS unit or a GPS unit that has a function for detecting the position thereof is provided with the function of the book marker 4, since the position of the user can be located, broadcasting stations and so forth can be more narrowly searched.

In addition, a small portable information device referred to as PDA (Personal Digital Assistant) can be used as the book marker 4. In this case, the PDA is provided with the function of the book marker 4 as software. The PDA virtually operates as the book marker 4.

In addition, a portable telephone unit that can subscribe to an Internet connection service can be used as the gateway device 11. For example, the book marker 4 may be structured as a strap for holding a portable telephone unit. In this case, one end of the strap is structured as the connector 22. The other end is connected to the portable telephone unit. A portable telephone unit that can subscribe to an Internet connection service is provided with a connector that allows data to be transmitted to Internet. When time information stored in the book marker 4 structured as a strap is transmitted to the portable telephone unit as the gateway device 11, the connector 22 disposed at an end of the strap is connected to a lower connector of the portable telephone unit. When the portable telephone unit is connected to Internet, time information can be easily transmitted from the gateway device 11 to the book mark search engine 10.

As a modification of the first embodiment, the button 20 can be accomplished with software on the gateway device 11. The function of the button 20 for storing time information is assigned to a predetermined key of the gateway device 11 or a predetermined position of the display screen thereof. Likewise, the function of the button 20 may be assigned to a predetermined icon on the display screen of the gateway device 11. When an icon assigned the function of the button 20 is operated by a pointing device such as a mouse, time information can be stored. The terminal ID 27 is stored to a predetermined area of the ROM 32, the RAM 33, or the hard disk 36 of the gateway device 11.

When the user operates an icon assigned as the button 20 on the gateway device 11, time information that represents the time at which the icon was operated is stored to a predetermined area of the RAM 33 or the hard disk 36. The time information is read from the RAM 33 or the hard disk 36 and transmitted along with the terminal ID 27 to the book mark search engine 10 through the communication line 8. The book mark search engine 10 searches the database corresponding to the transmitted information and transmits search results from the book mark search engine 10 to the gateway device 11 through the communication line 8.

When the searching operation is performed by the book mark search engine 10, a unique terminal ID 27 is supplied to each book marker 4. Corresponding to the terminal ID 27 and time information, since the user name and the musical piece name that he or she downloaded are obtained and used for market research.

Next, practical examples of the book marker 4 will be described. As long as the book marker 4 can store time information at user's desired timing, various modifications are available.

Figure 11A:
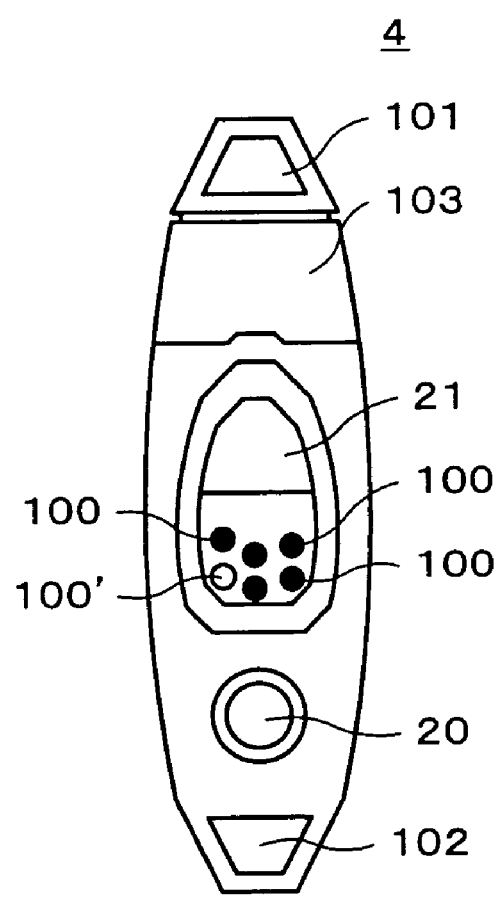
FIGS. 11A and 11B are schematic diagrams showing an example of the structure of the book marker.
Figure 11B:
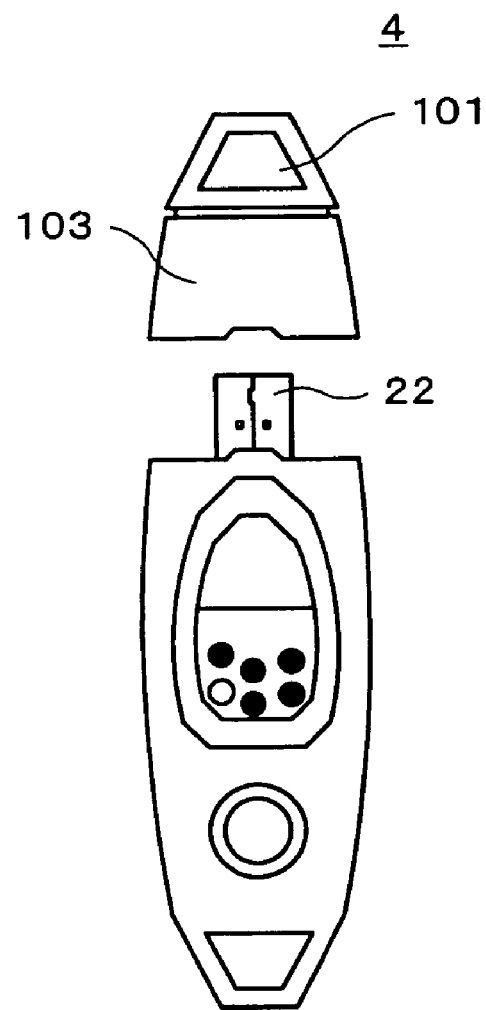

FIGS. 11A and 11B show an example of the book marker 4. As shown in FIG. 11A, in this example of the book marker 4, cut portions 101 and 102 are formed at both ends of the book marker 4. When a string or a chain is connected to the cut portion 101 or 102, the user can wear the book marker 4 as a pendant. The displaying portion 21 is disposed at an almost center position of the book marker 4. The button 20 is disposed below the displaying portion 21.

The cut portion 101 composes a cap 103. The connector 22 that is connected to the gateway device 11 is housed in the cap 103. When the cap 103 is pulled upward, as shown in FIG. 11B, the cap 103 is separated from the main body of the book marker 4. Thus, the connector 22 is exposed. In other words, the connector 22 directly protrudes from the main body of the book marker 4. In this example, the interface 29 of the book marker 4 is an interface corresponding to USB. The connector 22 is a male USB connector.

Since the connector 22 directly protrudes from the main body of the book marker 4, when the connector 22 of the main body of the book marker 4 is inserted into a female connector of the interface 37 of the gateway device 11, the book marker 4 can be connected to the gateway device 11. If an A type USB connector is used, the compatibility between the book marker 4 and the gateway device 11 as a personal computer can be preferably maintained.

Figure 12:
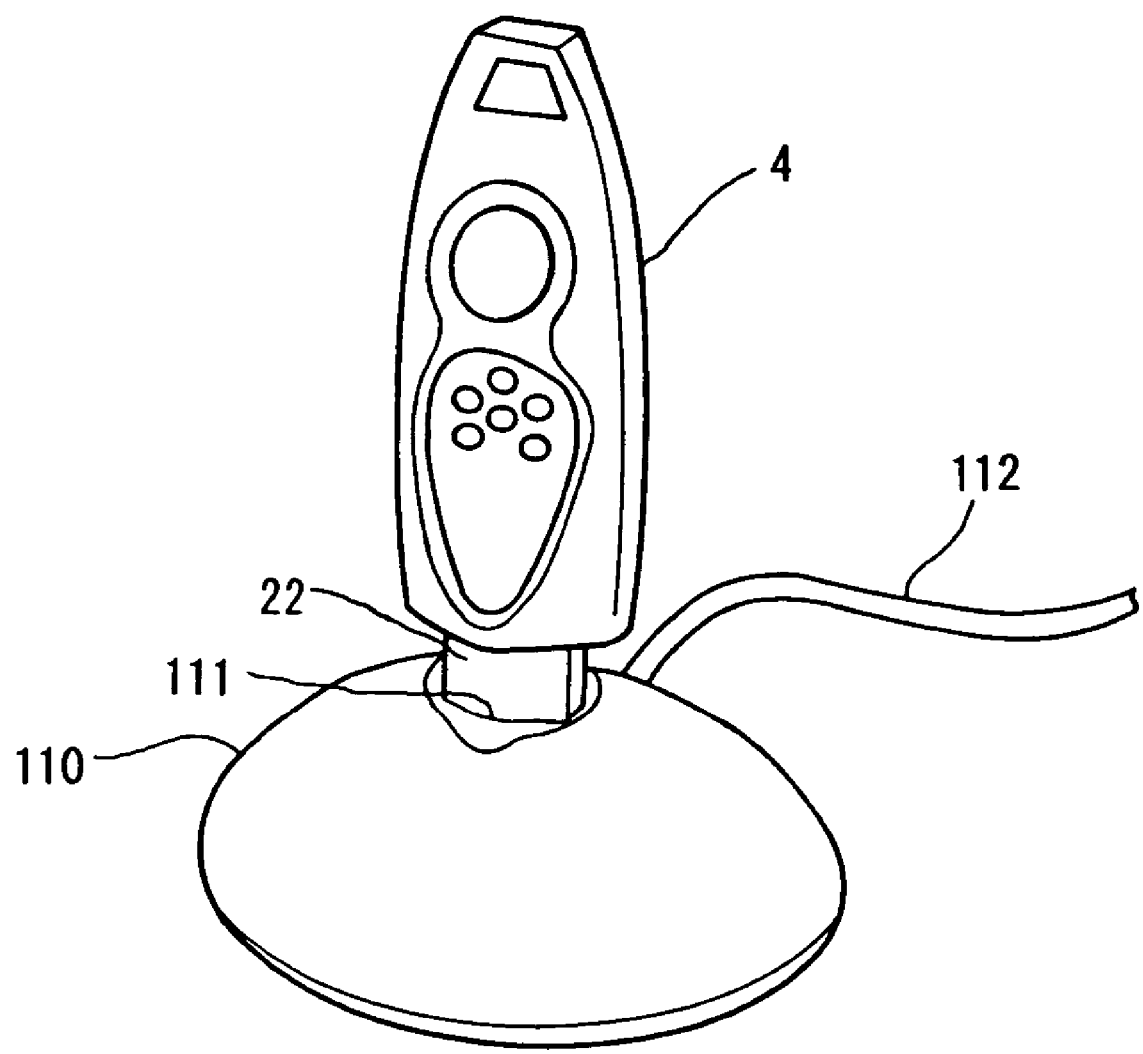
FIG. 12 is a schematic diagram showing an example of the appearance of a cradle to which the book mark was mounted.

Depending on the structure around the connector of the gateway device 11, the main body of the book marker 4 may not be physically connected to the gateway device 11. Thus, in this case, a connecting device that has a female USB connector and a connecting line for the gateway device 11 is used. The connecting device is referred to as cradle. FIG. 12 shows an example of the appearance of the cradle 110 to which the book marker 4 has been connected.

The cradle 110 is formed in a semi-sphere shape. At the vertex portion of the cradle 110, a female connector 111 corresponding to the connector 22 (male connector) of the book marker 4 is disposed. It should be noted that the shape of the cradle 110 is not limited to such a semi-sphere. In other words, according to the preset invention, the shape of the cradle 110 may be rectangular parallelopiped, quadrangular pyramid, or any complicated shape. A connecting line 112 extends from the female connector 111. The connecting line 112 is used to connect the cradle 110 to the gateway device 11.

By connecting the connecting line 112 to a predetermined connector of the gateway device 11, inserting the connector 22 of the book marker 4 into the female connector 111 of the cradle 110, and then mounting the book marker 4 to the cradle 110, time information stored in the memory 26 of the book marker 4 can be transmitted to the gateway device 11.

Entries of time information stored in the book marker 4 appear as ball shaped members 100, 100, 100, . . . and 100' under the control of the CPU 25. As was described above, the book marker 4 generates category information corresponding to time information that depends on the operating method of the button 20. The time information and the category information can be stored in the memory 26. The category information can be affected to the time information that appears on the displaying portion 21.

In the example, as shown in FIGS. 11A and 11B, black ball shaped members 100 and white ball shaped members 100' represent category information. A black ball shaped member 100 represents an operation of the button 20 corresponding to a radio broadcast. A white ball shaped member 100' represents an operation of the button 20 corresponding to a television broadcast. Another member (not shown) represents an operation of the button 20 corresponding to out-of-area.

Of course, entries of time information may appear as other members, not black and white ball shaped members. For example, entries of time information may appears as a number. In addition, the number of entries of time information that can be stored to the book marker 4 may appear.

Figure 13A:
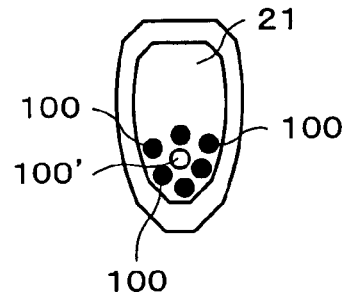
FIGS. 13A, 13B, and 13C are schematic diagrams showing an example of members that appears on the displaying portion in the case that entries of time information are being transmitted.
Figure 13B:
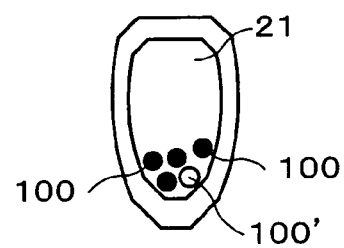
Figure 13C:
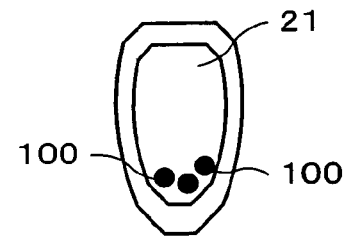

Members that appears on the displaying portion 21 may vary when entries of time information stored in the memory 26 of the book marker 4 are transmitted to the gateway device 11. FIGS. 13A, 13B, and 13C show an example of members that appear on the displaying portion 21 in the case that entries of time information are being transmitted to the gateway device 11. FIGS. 13A, 13B, and 13C show the case that the cap 103 shown in FIGS. 11A and 11B faces downward. FIGS. 13A, 13B, and 13C show states that time passes. In FIG. 13A, seven ball shaped members 100 and 100' successively disappear as they are sucked toward the connector 22 as time passes. Thus, a situation of which data stored in the memory 26 is transmitted to the gateway device 11 through the connector 22 appears as a virtual image.

Such an virtual image may appear on the gateway device 11. When an audio reproducing portion is disposed in the gateway device 11, a sound can be output as members vary and time passes. Actually, time information is transmitted in much shorter time than members that disappears on the displaying portion 21. In other words, it is not necessary to synchronize the real data transmission speed with the speed of members that disappear on the displaying portion 21. When entries of time information stored in the memory 26 are transmitted, as time passes, members decrease and/or a sound takes place. Thus, the user can visually know that entries of time information are being transmitted to the gateway device 11.

While entries of time information are being transmitted, they can be represented in various manners. For example, a predetermined character image may appear on the gateway device 11. In addition, members that appears on the displaying portion 21 of the book marker 4 can be synchronized with members that appear on the gateway device 11 so that the user can see a sequence of entries of time information transmitted from the book marker 4 to the gateway device 11.

Figure 14A:
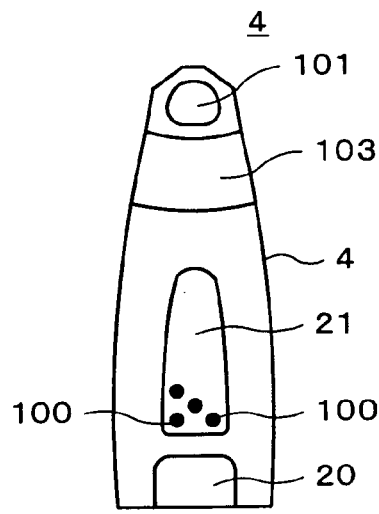
FIGS. 14A and 14B are schematic diagrams showing a modification of the book marker.
Figure 14B:
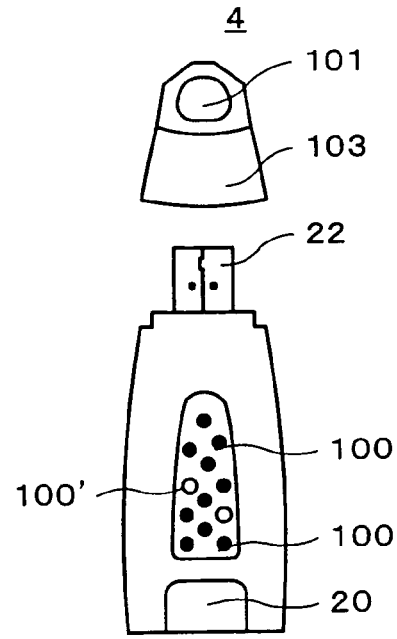

FIGS. 14A and 14B show a modification of the book marker 4. The book marker 4 shown in FIGS. 14A and 14B is different from the book marker 4 shown in FIGS. 11A and 11B in that the lower cut portion 102 is not formed. FIG. 14A shows the state that the cap 103 has been mounted. FIG. 14B shows the state that the cap 103 has been dismounted and the connector 22 has been exposed. In the modification shown in FIGS. 14A and 14B, the button 20 can be pressed from the bottom.

Figure 15A:
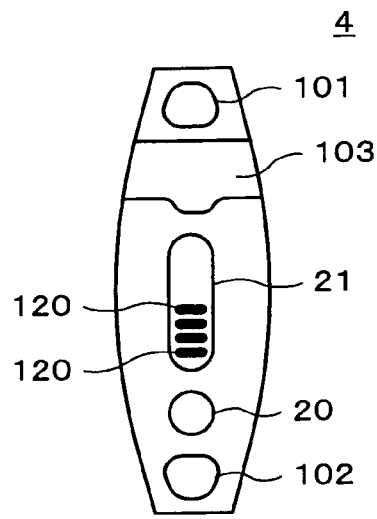
FIGS. 15A and 15B are schematic diagrams showing another modification of the book marker.
Figure 15B:
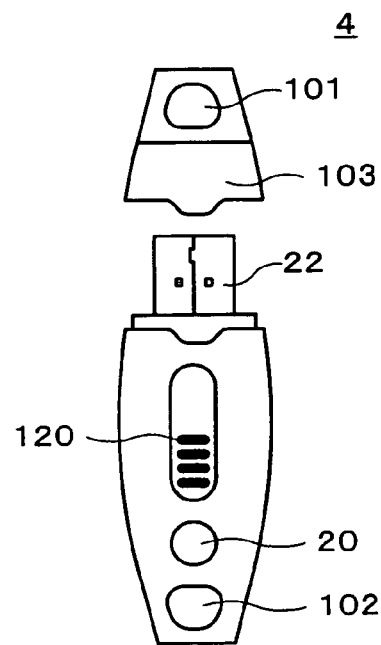

FIGS. 15A and 15B show another modification of the book marker 4. The book marker 4 shown in FIGS. 15A and 15B is different from the book marker 4 shown in FIGS. 11A and 11B in that members that represent entries of time information of the displaying portion 21 are formed as bars 120. FIG. 15A shows the state that the cap 103 has been mounted. FIG. 15B shows the state that the cap 103 has been removed and the connector 22 has been exposed.

Figure 16A:
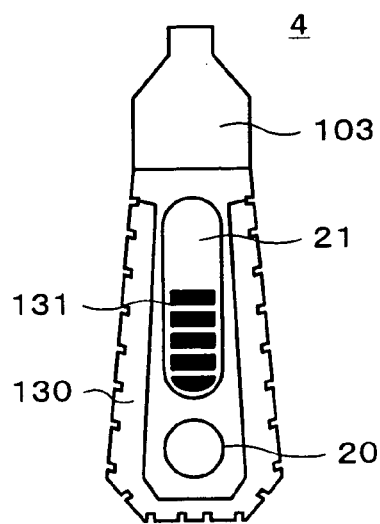
FIGS. 16A and 16B are schematic diagrams showing another modification of the book marker.
Figure 16B:
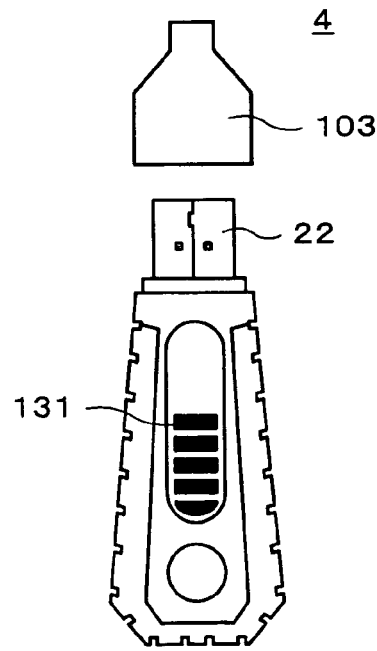

FIGS. 16A and 16B show another modification of the book marker 4. The book marker 4 shown in FIGS. 16A and 16B is different from the book marker 4 shown in FIGS. 11A and 11B in that the cut portions 101 and 102 are omitted and a slide-proof portion 130 is disposed. The slide-proof portion 130 is formed on the side of the main body of the book marker 4 and composed of for example rubber. In this example, an area 131 of the displaying portion 21 represents entries of time information. FIG. 16A shows the state that the cap 103 has been mounted. FIG. 16B shows the state that the cap 103 has been dismounted and the connector 22 has been exposed.

FIG. 17 shows another modification of the book marker 4. In this modification, a ring 150 is disposed to the cap 103 of the book marker 4. In the state that the cap 103 has been mounted to the book marker 4, it can be used as for example a key holder.

The book marker 4 as each of the modifications shown in FIGS. 14A, 14B, 15A, 15B, 16A, 16B, and 17 may be mounted to the cradle 110.

Figure 18:
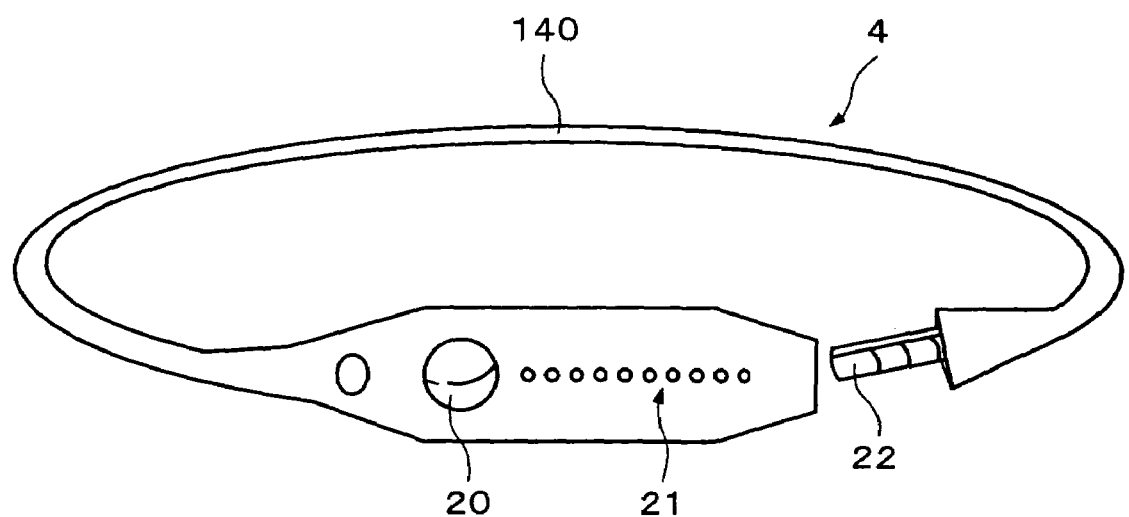
FIG. 18 is a schematic diagram showing another modification of the book marker.

FIG. 18 shows another modification of the book marker 4. In this modification, the book marker 4 is formed in a wrist band shape. The displaying portion 21 is composed of a plurality of lighting portions for example LEDs (Light Emitting Diodes) that light corresponding to entries of time information that are stored. All lighting portions may be initially lit. As the number of entries of time information that are stored increases, the number of the lighting portions that light may decrease. A connecting line 140 protrudes from one end of the main body of the book marker 4. The connector 22 is disposed at a tail of the connecting line 140. A structure that allows the connector 22 to be connected and disconnected is disposed at a head of the main body of the book marker 4. When the connector 22 is connected to the head of the book marker 4, it is formed in a ring shape.

Figure 19:
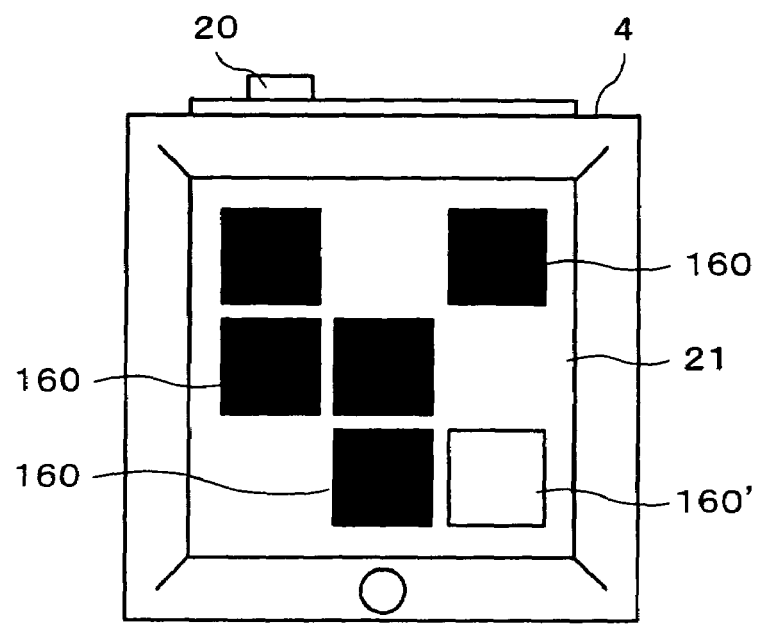
FIG. 19 is a schematic diagram showing another modification of the book marker.

FIG. 19 shows another modification of the book marker 4. The book marker 4 shown in FIG. 19 is used as a desk top device such as a table clock. The button 20 is disposed at an upper position of the book marker 4. The displaying portion 21 is disposed on the front surface of the book marker 4. In this modification of the book marker 4, entries of time information that were stored appear as square members 160 and 160'. For example, a black square member 160 represents an entry of time information corresponding to a radio broadcast. A white square member 160' represents an entry of time information corresponding to a television broadcast. The square members 160 and 160' appear at random positions. The connector 22 connected to the gateway device 11 is disposed on a rear surface (not shown) of the book marker 4. In this modification of the book marker 4 shown in FIG. 19, a female USB connector may be disposed on the book marker 4. With a connecting line having two male connectors, the book marker 4 may be connected to the gateway device 11.

The maximum number of entries of time information that are stored to the book marker 4 may be limited. For example, in consideration of searching operations that will be performed later, the number of entries of time information that can be stored to the book marker 4 may be designated to several entries to ten and several entries as an upper limit. In this case, a proper means for informing the user that the number of entries of time information becomes or approaches the upper limit is preferably disposed. For example, a sound generating means that generates a beep sound may be disposed to the book marker 4. With such a sound generating means, when the number of entries of time information that can be stored to the book marker 4 becomes one, an alarm sound may be generated. When the number of entries of time information that can be stored to the book marker 4 is zero, an alarm sound is generated when the button 20 is pressed.

A sound generated by the sound generating means is not limited to such an alarm sound. For example, whenever the user operates the button 20 of the book marker 4, a predetermined sound may be generated. Thus, the user can know whether or not the operation of the button 20 was acknowledged without need to see the displaying portion 21 of the book marker 4. In addition, a sound that varies corresponding to the operating method of the button 20 may be generated.

A cancel button may be disposed to the book marker 4. With the cancel button, entries of time information that were stored can be erased in the order of the oldest entry or the latest entry. Alternatively, the user can designate an entry to be deleted from those of time information that were stored.

Besides the above-described examples, the book marker 4 can be built in various electronic devices. For example, the book marker 4 can be built in a radio receiver. In addition, the book marker 4 can be built in a car stereo system. Of course, devices in which the book marker 4 is built are not limited to electronic devices. The book marker 4 is preferably built in a device that can be used as a mobile unit.

In the above-described examples, the button 20 is disposed as one operating portion for causing time information to be stored to the book marker 4. By operating the button 20 in various manners, a plurality of category flags are generated. However, it should be noted that the present invention is not limited to such examples. Instead, a plurality of buttons may be disposed to the book marker 4. Different flags may be assigned to these buttons. For example, a button 20 for a radio broadcast and a button 20' for a television broadcast may be disposed. In addition, in a combination of a plurality of buttons, much more category flags can be generated.

The operating portion for storing time information of the book marker 4 is not limited to a push button. Alternatively, a rotating switch that rotatably selects one of contacts may be disposed to the book marker 4. With the rotating switch, time information may be stored. Alternatively, a touch sensor that defects a touching of the user may be used as the operating portion.

In the above-described examples, the book marker 4 and the gateway device 11 are connected through an interface such as USB that allows data to be transmitted to a computer system. However, it should be noted that the present invention is not limited to such an example. In other words, since the amount of data transmitted from the book marker 4 to the gateway device is very small, an interface having the lowest data transmission rate can be used. For example, data can be transmitted using a conventional shield cable that is used for a head set.

In addition, the book marker 4 can be accomplished as software of a personal computer. In this case, a personal computer as the book marker 4 may be additionally used. Alternatively, when the gateway device 11 is a personal computer, the gateway device 11 can be used as the book marker 4. Software that accomplishes the book marker 4 on the personal computer can be downloaded from a communication network such as Internet. Of course, such software can be distributed or sold using a record medium such as a CD-ROM.

Such software may be obtained from another web site through the book mark search engine 10 connected to the gateway device 11. Alternatively, such software may be stored in the book mark search engine 10. In this case, the software may be directly downloaded from the gateway device 11. When the user performs a particular operation on a personal computer that executes the software that accomplishes the book marker 4, time information is stored.

Alternatively, the program that causes the book marker 4 to operate may be downloaded. For example, in the book marker 4, the ROM 91 is composed of an EEROM (Electrically Erasable Programmable ROM) that allows stored contents to be electrically rewritten. The program that is supplied from the gateway device 11 or the like through the interface 29 is stored to the ROM 91.

Thus, in the initial state, the program is not stored to the ROM 91. The program is written to the ROM 91 corresponding to a predetermined procedure. As a result, the book marker 4 can be used.

When the user of the book marker 4 is registered, the book marker 4 is connected to the gateway device 11. The terminal ID 27 is transmitted from the book marker 4 to the book mark search engine 10 through the gateway device 11. After the user of the book marker 4 has been correctly registered, a program for controlling the operation of the book marker 4 is transmitted from the book mark search engine 10 to the gateway device 11. This program is transmitted from the gateway device 11 to the book marker 4 through the interface 29. The transmitted program is written to the ROM 91. As a result, the book marker 4 can be used.

Alternatively, a startup program for the CPU 25 and a communication control program for the interface 29 can be pre-stored to the ROM 91.

When the ROM 91 is rewritable, the version of the operation control program of the book marker 4 can be updated. For example, a program is downloaded from the network connected to the gateway device 11. The downloaded program is transmitted to the book marker 4. As a result, the contents stored in the ROM 91 are rewritten.

When the transmitted program can be selected by the user, members that appear on the displaying portion 21 can be preferably selected by the user.

The operation control program for the book marker 4 can be transmitted from another site that can be connected to the gateway device 11 as well as the book mark search engine 10.

The control program for the book marker 4 can be distributed using a record medium such as a CD-ROM or a floppy disc, instead of downloading from the network. The program recorded in such a record medium is read by the gateway device 11. The program is transmitted to the book marker 4. As a result, the contents stored in the ROM 91 are rewritten.

Next, another modification of the first embodiment of the present invention will be described. According to the modification, in addition to user's personal computer, an information terminal unit that is installed at a retail store is used as the gateway device 11.

Such information terminal units are installed at relatively large CD stores and so-called convenience stores. The information terminal unite are connected to a predetermined network. When the user operates such an information terminal unit corresponding to a menu displayed on the screen thereof, he or she can obtain desired information. The user can see the obtained information and obtain it with a record medium such as a floppy disk or a CD-ROM. In addition, the information terminal unit is provided with a predetermined interface. The obtained information can be directly transferred to user's information device through a relevant interface. Hereinafter, such an information terminal unit is referred to as "kiosk terminal unit".

Since a kiosk terminal unit can be accomplished with almost the same structure as a conventional computer as shown in FIG. 7, the description of the structure of the kiosk terminal unit is omitted. The kiosk terminal unit has a bus to which a CPU and a memory are connected. In addition, a displaying device and an input interface that accomplish GUI (Graphical User Interface) are connected to the bus. The kiosk terminal unit also has a large storage medium such as a HDD, a data outputting means, a network connecting means, and so forth.

The kiosk terminal unit is connected to the above-described book mark search engine 10 (the connection is not shown). The kiosk terminal unit is provided with an interface corresponding to the connector 22 of the book marker 4 so that data can be transmitted between the book marker 4 and the kiosk terminal unit. With the kiosk terminal unit, the user can use the searching service using the book marker 4 regardless of whether he or she has the gateway device 11.

The kiosk terminal unit can be always connected to a high speed communication line that has a higher transmission rate than a conventional home-use network. The kiosk terminal unit can have larger storage mediums (that are a memory and a HDD) than user' personal computer. Thus, when the user uses a kiosk terminal unit, he or she can have a different service from that in the case that a personal computer is used as the gateway device 11.

For example, the book marker 4 is provided with a memory having a relatively large storage capacity. The book marker 4 is connected to a kiosk terminal unit. Corresponding to time information stored in the memory 26, music data is searched with the kiosk terminal unit. The kiosk terminal unit displays a screen as shown in FIG. 10. When the kiosk terminal unit has an audio reproducing means, by operating the button 58, the user can listen to music data as search results.

By operating the button 60, the user can download music data as search results to the book marker 4 through the connector 22. In the case that the music data is charged, when the user pays a designated fee through a money slot, the music data as the search results is downloaded to the book marker 4. The user transfers the downloaded music data from the book marker 4 to a personal computer or a dedicated music data reproducing apparatus. When music data that is downloaded is compression-encoded corresponding to a predetermined compression encoding method, the memory storage space and download time can be preferably reduced.

As examples of the compression encoding method for music data, MP3 (Moving Picture Experts Group 1 Audio Layer 3), ATRAC (Adaptive Transform Acoustic Coding), ATRAC2, ATRAC3 (that are modifications thereof) and so forth can be used. As other examples of the compression encoding method, PASC (Precision Adaptive Sub-band Coding), Twin VQ (trademark), Real Audio (trademark), Liquid Audio (trademark), and so forth can be used.

When the book marker 4 is provided with a decoder and a audio reproducing means corresponding to a predetermined music data compression encoding method, music data that has been downloaded and stored to the memory can be decoded and reproduced. Thus, the user can enjoy listening to downloaded music data. An example of the audio reproducing means is an audio reproducing system using a head set and so forth.

When music data is directly downloaded to the book marker 4, there may be a problem about copyright. This problem can be solved by using an encrypting system. In the encrypting system, music data is pre-encoded corresponding to a predetermined encoding method. The book marker 4 has a decrypting portion that decrypts encrypted music data. Encrypted music data is decrypted only when it is reproduced by the book marker 4. Even if music data downloaded to the book marker 4 is transmitted to a personal computer or the like, the music data cannot be decrypted unless the user has a decrypting key that can be used by the personal computer.

In addition, when a retail store that has a kiosk terminal unit sells music CDs, the kiosk terminal unit may issue an order sheet as a search result corresponding to time information stored in the book marker 4. The user can hand the order sheet to a clerk of the store and buy a music CD corresponding to the search result. When the kiosk terminal unit is provided with a cart system that conveys music CDs, the kiosk terminal unit can directly vend a music CD corresponding to a search result.

Figure 20:
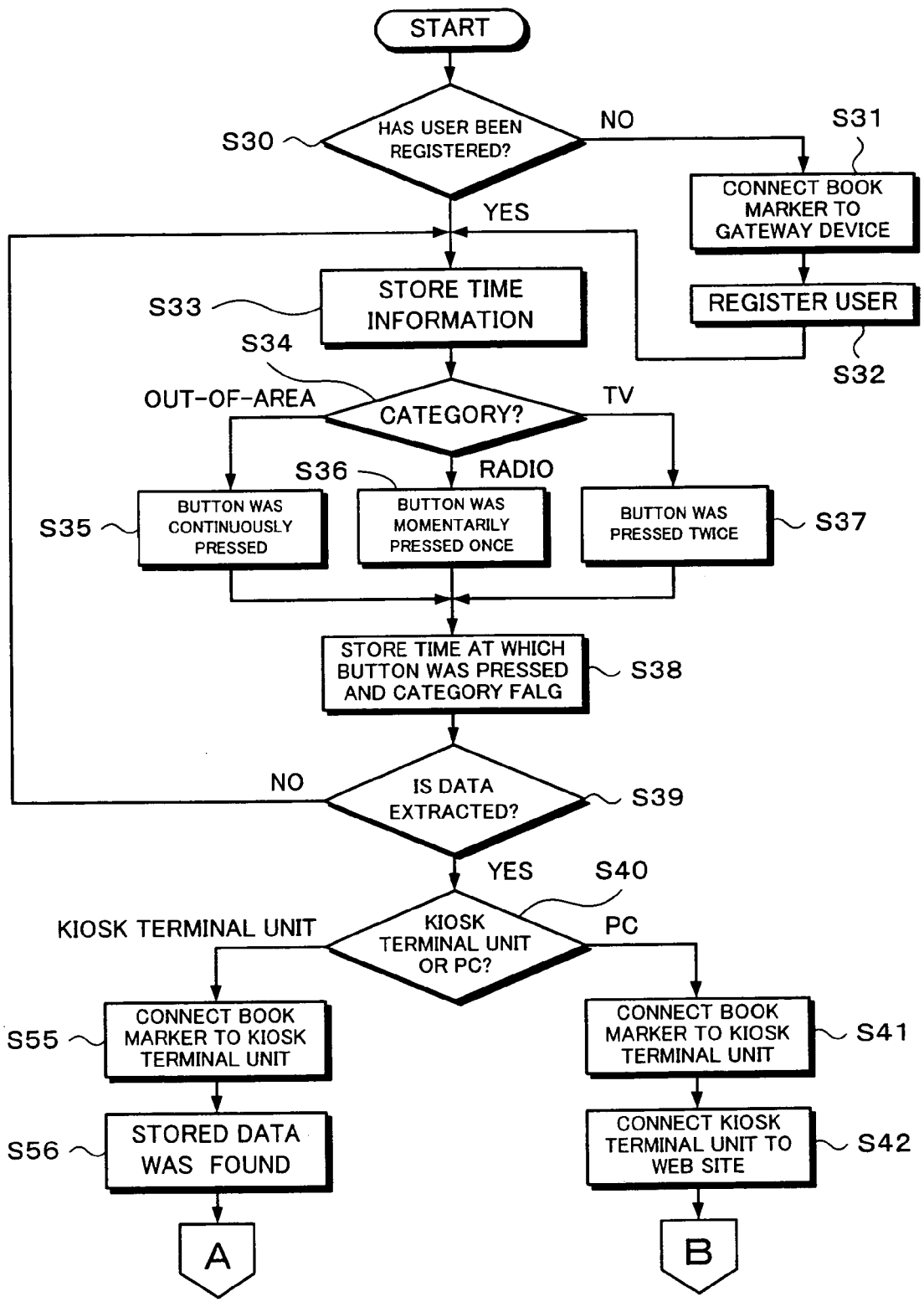
FIG. 20 is a first part of a flow chart showing a process after the user obtains a book marker until he or she purchases a music CD.
Figure 21:
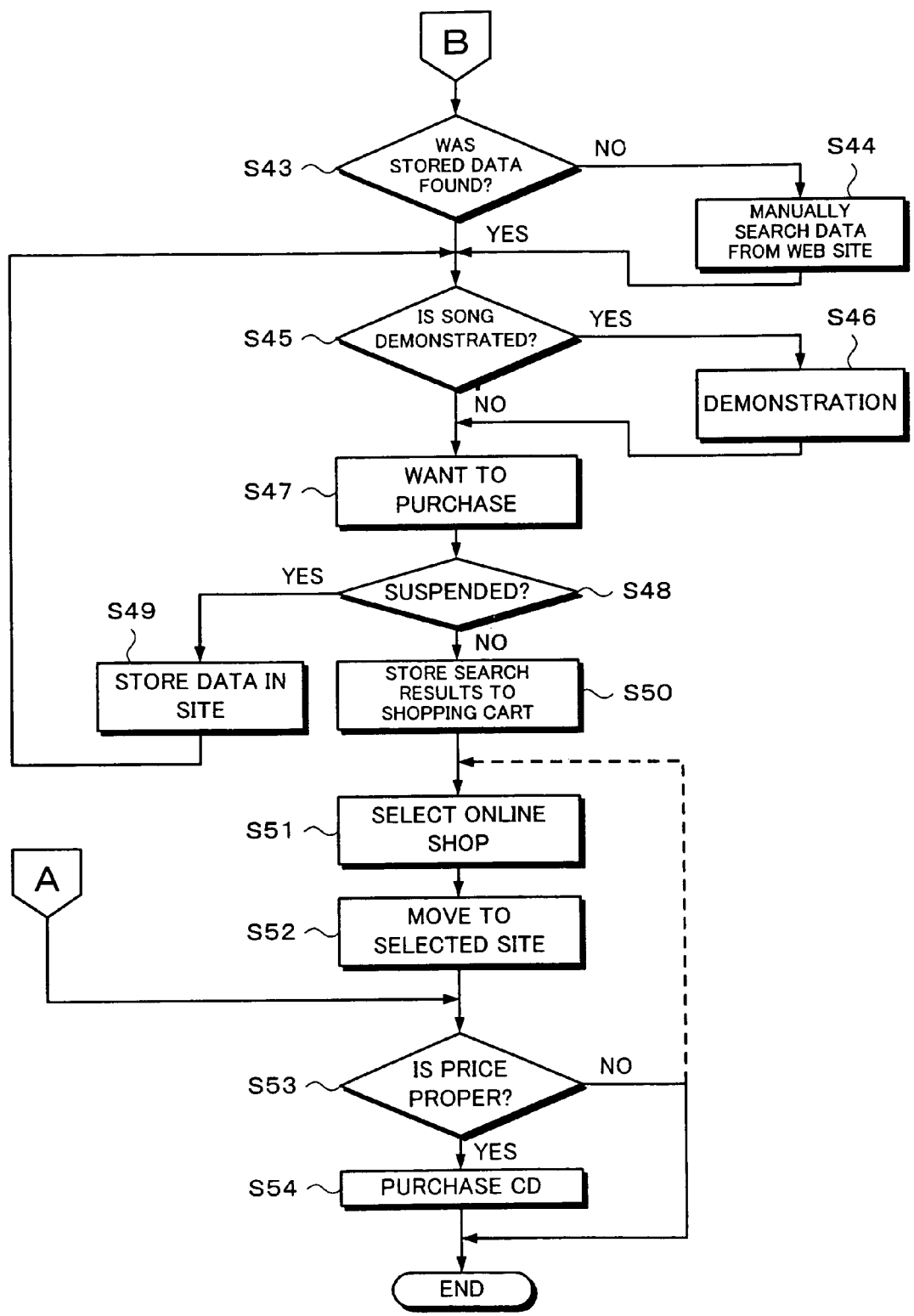
FIG. 21 is a second part of the flow chart shown in FIG. 20.

Next, a searching process for music data corresponding to time information stored in the book marker 4 and a purchasing process for a music CD corresponding to the search result according to the above-described embodiments will be described in a practical manner. FIGS. 20 and 21 are a first part and a second part of a flow chart showing a process performed after the user is registered to the book marker 4 until a music CD is purchased. FIGS. 22 to 27 show examples of display screens displayed on the gateway device 11 corresponding to the flow chart shown in FIGS. 20 and 21. "A" and "B" shown in FIG. 20 are connected to "A" and "B" shown in FIG. 21, respectively.

When the user uses the book marker 4, the user should register himself or herself to it. In FIG. 20, at step S30, it is determined whether or not the user has been registered. When the determined result at step S30 is Yes (namely, the user has been registered), the flow advances to step S33. When the determined result at step S30 is No (namely, the user's book marker 4 has not been registered), the flow advances to step S31. At step S31, the book marker 4 is connected to the gateway device 11. At step S32, the user is registered to the book marker 4 by a predetermined operation of the gateway device 11. The gateway device 11 may be user's personal computer or an above-described kiosk terminal unit. After the user has been registered to the book marker 4, the flow advances to step S33.

When the determined result at step S30 is Yes (namely, the user has been registered to the book marker 4), the flow advances to step S33. At step S33, the book marker 4 is operated by the user. In other words, when the user is listening to his or her favorite musical piece, he or she presses the button 20. As a result, time information at which the user pressed the button 20 is stored to the book marker 4. As was described above, depending on in what manner the button 20 was pressed, time information that is stored in the book marker 4 is categorized (at step S34). When time information is stored out of the registered area, the user continuously presses the button 20 for a predetermined time period or longer (at step S35). To store time information corresponding to a radio broadcast to the book marker 4, the user momentarily presses the button 20 once (at step S36). To store time information corresponding to a television broadcast to the book marker 4, the user presses the button 20 twice in a predetermined time period (at step S37). Thereafter, the flow advances to step S38. At step S38, the time information at which the button 20 was pressed, identification information, and the category flag that represents the operating manner of the button 20 are stored to the memory 26 of the book marker 4.

When at least one entry of time information has been stored in the memory 26 of the book marker 4, the entry of the time information can be extracted from the memory 26 and a musical piece can be searched by the bookmark search engine 10 corresponding to the entry of the time information (at step S39). When the determined result at step S39 is Yes (namely, a musical piece is searched corresponding to time information), the flow advances to step S40. When the determined result at step S39 is No (namely, time information is further stored to the book marker 4), the flow returns to step S33.

As was described above, the searching operation using time information stored in the book marker 4 is performed when the book marker 4 is connected to user's personal computer (PC) or a kiosk terminal unit as the gateway device 11. When the user performs the searching operation using his or her personal computer as the gateway device 11, the flow advances to step S41. At step S41, the book marker 4 is connected to the personal computer. In addition, the personal computer is connected to for example Internet. At step S42, the book marker 4 is connected to an available web site at which the bookmark search engine 10 can be used.

Figure 22:
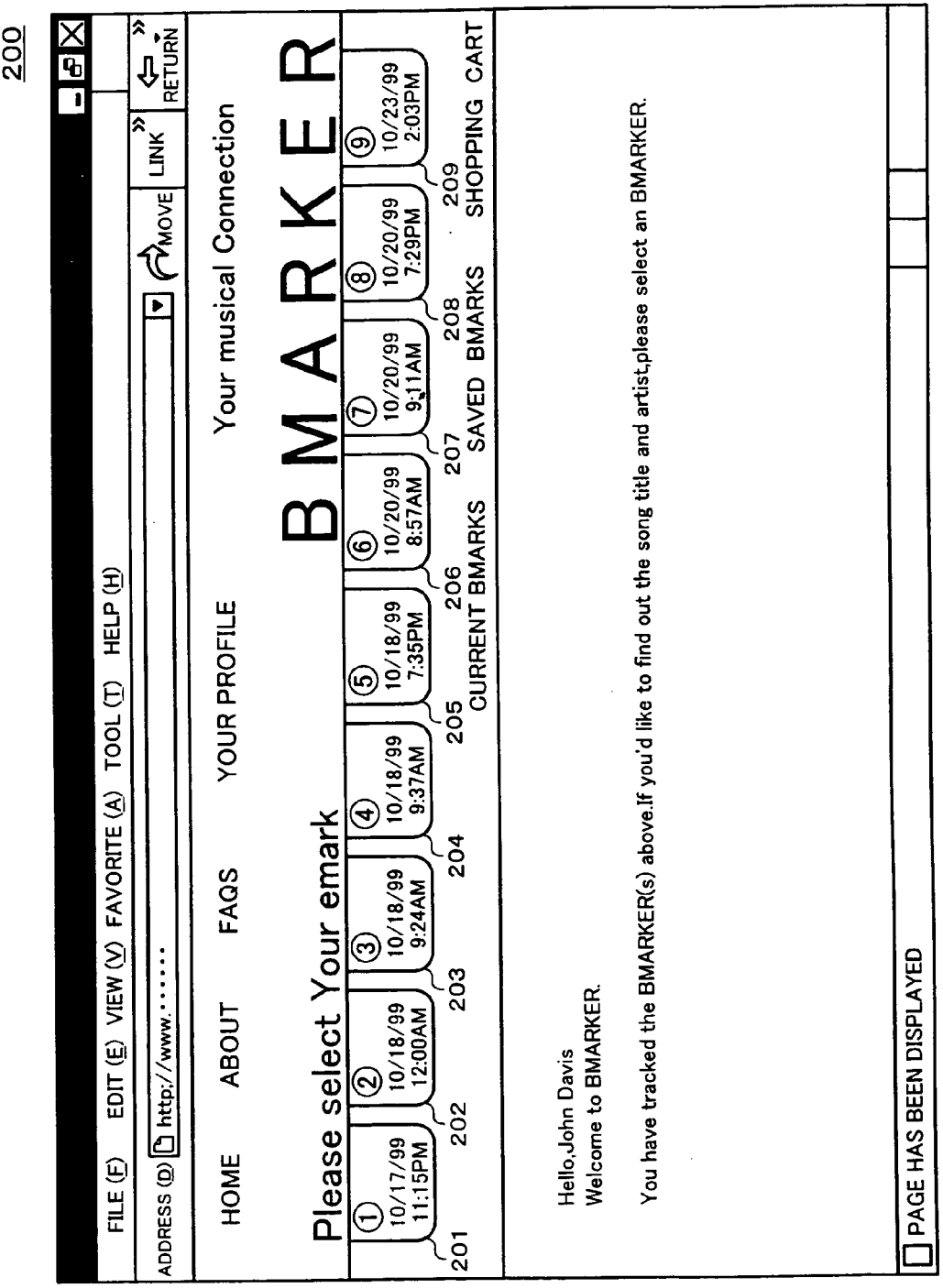
FIG. 22 is a schematic diagram showing an example of a time information selection screen displayed on a personal computer in the case that time information was transmitted to the personal computer.

Time information stored in the memory 26 of the book marker 4 is transmitted to the personal computer. FIG. 22 shows an example of a time information selection screen 200 that is displayed on the personal computer when time information has been transmitted thereto. In this example, entries (1) to (9) of time information stored in the book marker 4 are transmitted to the personal computer. The stored date and time of each of the entries (1) to (9) of the time information appear as members 201 to 209.

The user selects desired information from the members 201 to 209. For example, the user selects one of the members 201 to 209 using a pointing device such as a mouse and a cursor that moves on the screen corresponding to the movement of the mouse. By clicking a mouse button, the user confirms the selected information. In addition to the terminal ID 27 of the book marker 4, the selected information is transmitted from the personal computer to the book mark search engine 10. The transmission data is composed of the terminal ID 27 as a header and a pair of an entry of time information and a category flag thereof.

The book mark search engine 10 searches title information of musical piece that were broadcast from registered broadcasting stations corresponding to the time information and the terminal ID 27 that were transmitted. At this point, corresponding to the category flag transmitted along with the time information, title information is searched from radio stations or television stations. When title information is searched from television stations, musical pieces of music program, musical pieces of commercials, theme songs of dramas and musical pieces in dramas may be searched.

When the category flag represents out-of-area, title information is searched from musical pieces that were broadcast from broadcasting stations out of the registered area represented by user's zip code corresponding to the terminal ID 27.

Figure 23:
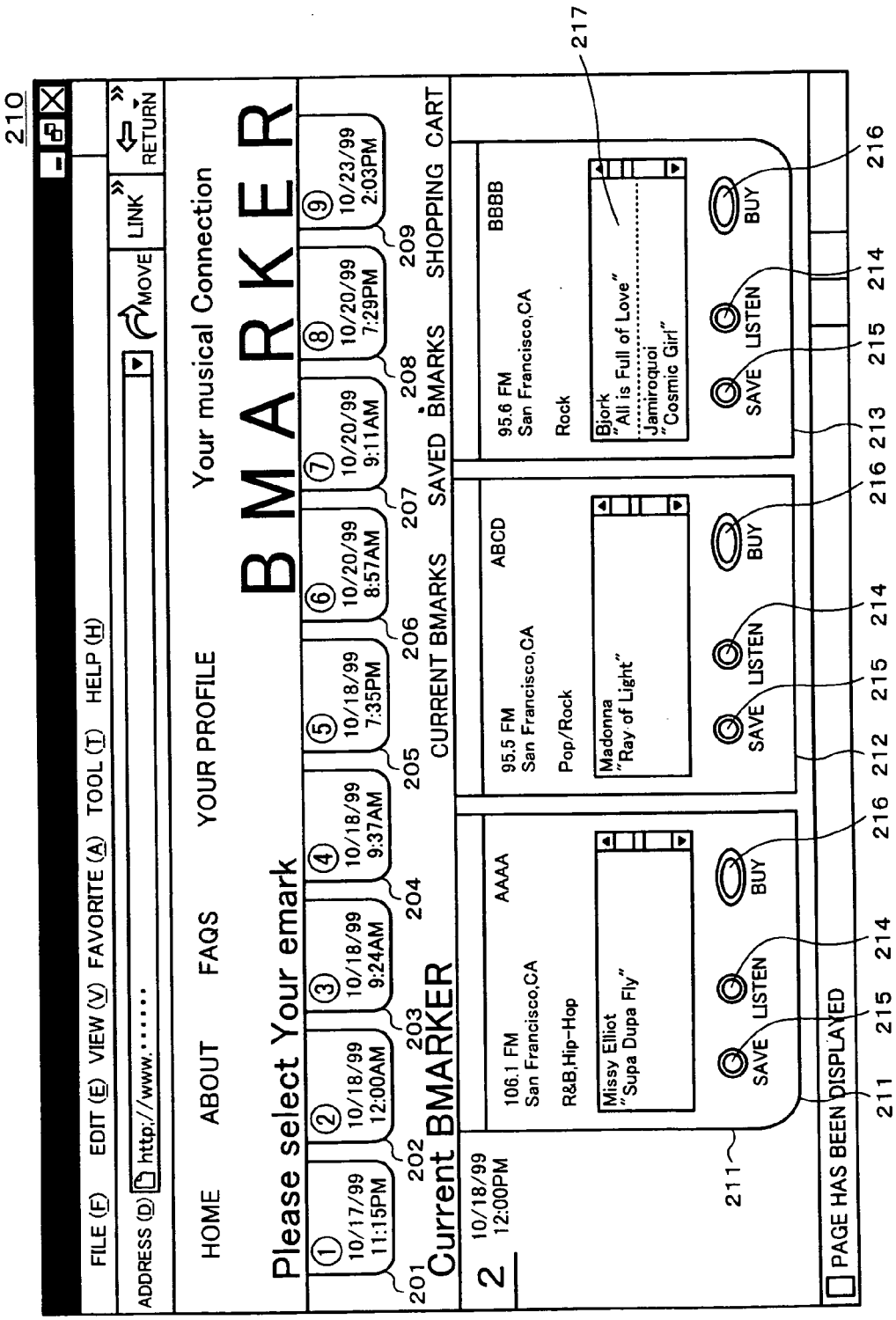
FIG. 23 is a schematic diagram showing an example of a search result display screen displayed on the personal computer corresponding to transmitted search results.

Search results obtained by the book mark search engine 10 are transmitted to the personal computer. FIG. 23 shows an example of a search result display screen 210 displayed on the personal computer corresponding to transmitted search results. In this example, in FIG. 22, the user selects the entry (2) of time information that appears as the member 202. The book mark search engine 10 searches musical piece information corresponding to the selected entry (2) of time information. As search results, musical piece information 211, 212, and 213 appear on the search result display screen 210.

In other words, the search results show that musical pieces represented by the musical piece information 211, 212, and 213 were broadcast from broadcasting stations "AAAA", "ABCD", and "BBBB" at 12:00 am on Oct. 18, 1999 as the entry (2) of time information, respectively. Thus, it is supposed that the user listened to one of these musical pieces and operated the button 20 of the book marker 4 at the time represented by the entry (2) of the time information.

When the user operates the button 20 of the book marker 4, it should be noted that he or she does not always operate the button 20 just when he listens to his or her favorite musical piece. In other words, there may be a situation of which after the user had listened his or her favorite musical piece, he operated the button 20. Thus, it is preferable to consider a proper margin for a broadcast time in searching musical piece information. In this case, as represented with a member 217, musical piece information for two musical pieces appears.

Figure 24:
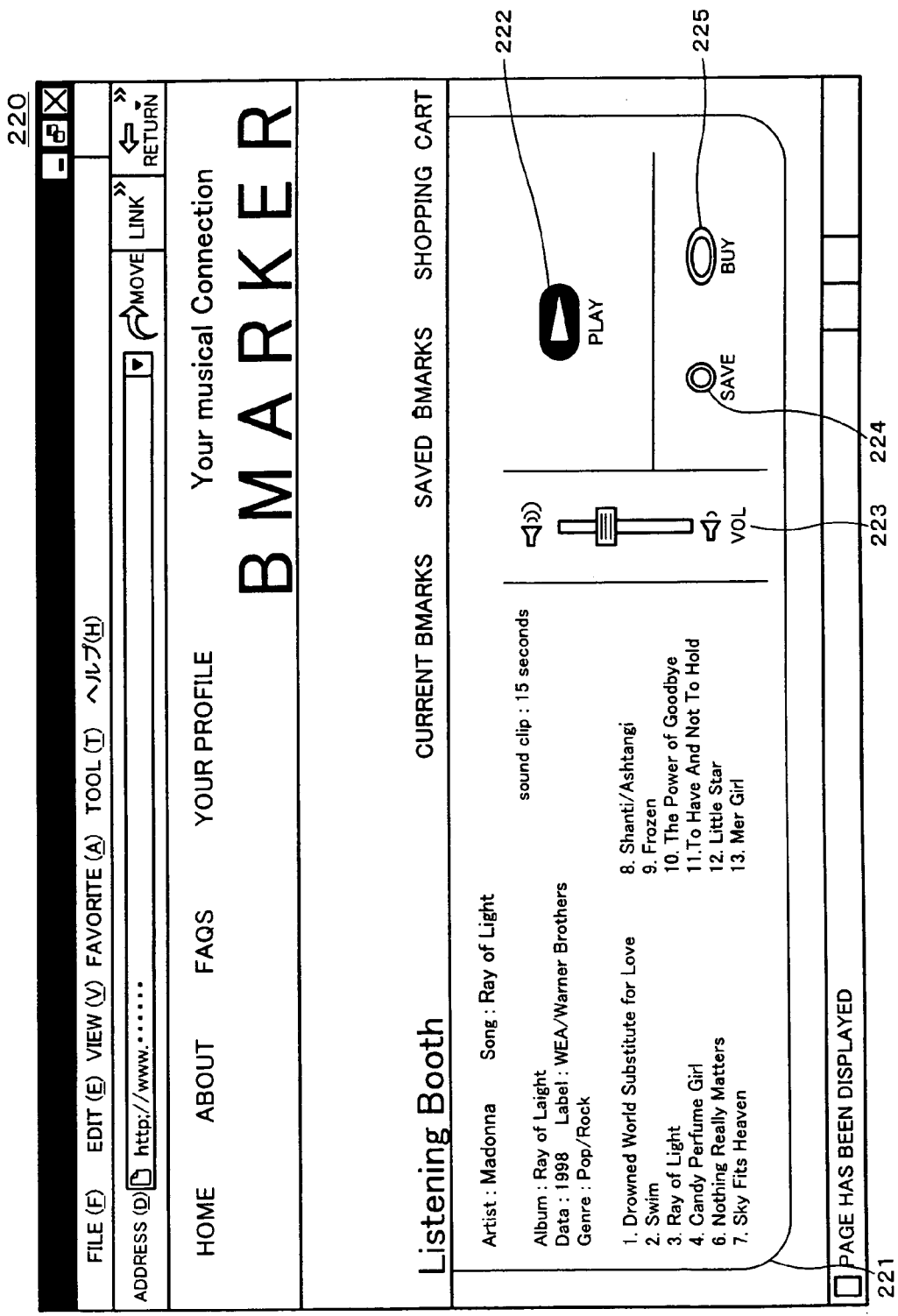
FIG. 24 is a schematic diagram showing an example of a musical piece demonstration screen displayed on the personal computer.

With reference to the musical piece information 211, 212, and 213 on the search result display screen 210, the user determines whether there is a musical piece he or she listened at the time represented by the entry (2) of the time information stored in the book marker 4 (at step S43). When the user wants to listen to a demonstration of the selected musical piece, he or she operates a LISTEN button 214 that appears at each of the musical piece information 212, 213, and 214 (at step S45). When the user operates the LISTEN button 214, a demonstration listening screen 220 that allows the use to listen to a demonstration of the selected musical piece appears. FIG. 24 shows an example of the demonstration listening screen 220.

When the user operates the LISTEN button 214, the personal computer transmits information that represents what button 215 was pressed to the book mark search engine 10. In this example, it is assumed that the LISTEN button 214 of the musical piece information 213 was operated. The book mark search engine 10 searches information of a music CD that contains a musical piece corresponding to the transmitted information from the database 1. The searched information is transmitted to the personal computer. For example, additional information of the music CD such as musical piece names thereof appears as a list in a CD information display portion 221 on the demonstration listening screen 220.

In the example shown in FIG. 24, an operating portion for controlling a reproducing operation of a musical piece appears on the right of the CD information display portion 221. When the user operates a PLAY button 222, he or she can listen to a demonstration of a musical piece corresponding to the LISTEN button 214. When the user operates the PLAY button 222, information that represents that the user pressed the PLAY button 222 is transmitted to the book mark search engine 10. Music data is pre-stored in the database 1. Music data corresponding to the selected musical piece information is transmitted from the book mark search engine 10 to the personal computer.

Music data may be transmitted from another web site connected to the book mark search engine 10 through a network.

The user listens to a demonstration of transmitted music data with the audio processing means 39 and the speaker 90 disposed in the personal computer (at step S46). In FIG. 24, an operating portion 223 is a volume slider with which the audio volume of the reproduced sound can be adjusted. When the user listens to a demonstration of a musical piece, the reproduction length of the play time is limited. For example, only 15 seconds from the beginning or a principal portion of a musical piece are preferably reproduced.

In the flow chart shown in FIG. 21, it is determined whether or not a desired musical piece has been searched at step S43. Thereafter, the musical piece is demonstrated at step S45. Alternatively, after a musical piece is demonstrated, it may be determined whether or not a desired musical piece has been obtained. When desired musical piece information cannot be obtained as a search result at step S43, a search condition may be manually designated at step S44. Thus, desired musical piece information can be obtained.

The user wants to purchase a desired musical piece from the musical piece information 211, 212, and 213 as the search results (at step S47). This operation is performed as a result of the demonstration at step S46 or directly from the musical piece information 211, 212, and 213 that appear. The user purchases a musical piece with a music CD that contains the musical piece (as will be described later). Alternatively, the user may purchase a single musical piece rather than a music CD that contains it.

When the user does not want to purchase a searched musical piece at once, he or she can purchase it later (at step S48). In this case, the search results can be stored in the web site of the book mark search engine 10 (at step S49). When the user operates a SAVE button 215 of each of the musical piece information 211, 212, and 213 on the demonstration listening screen 220 or a SAVE button 224 on the demonstration listening screen 220, musical piece information as search results is stored along with user information such as terminal ID 27 to the database 2 of the book mark search engine 10.

Figure 25:
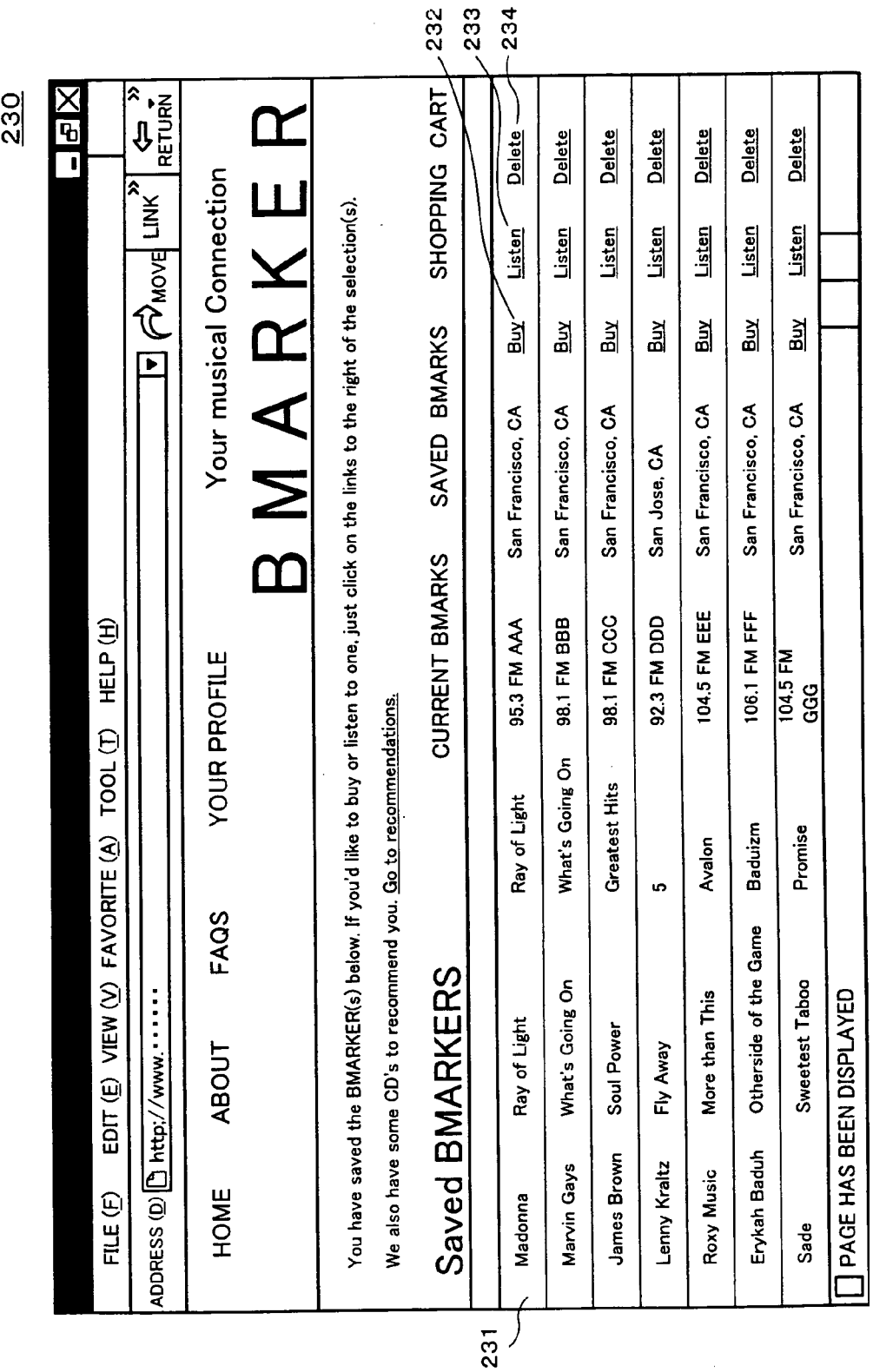
FIG. 25 is a schematic diagram showing an example of a musical piece information saving screen displayed on the personal computer.

When the user operates the SAVE button 214 or the SAVE button 224, a save screen 230 shown in FIG. 25 appears. The save screen 230 contains a list of information 231 of musical pieces that were saved. On the save screen 230, when the user operates a Listen button 233, he or she can listen to a demonstration of the selected musical piece. When the user operates a Buy button 232, he or she can order the selected musical piece. When the user operates a Delete button 234, he or she can delete the information of the selected musical piece on the save screen 230.

When the user operates a BUY button 216 on the search result display screen 210, a BUY button 225 on the demonstration listening screen 220, or the Buy button 232 on the save screen 230, he or she can order the selected musical piece. The information of the ordered musical piece is correlated with the user information such as the terminal ID 27. The resultant information is temporarily stored to a predetermined memory area of the book mark search engine 10 (at step S50). This memory area is referred to as shopping cart.

Figure 26:
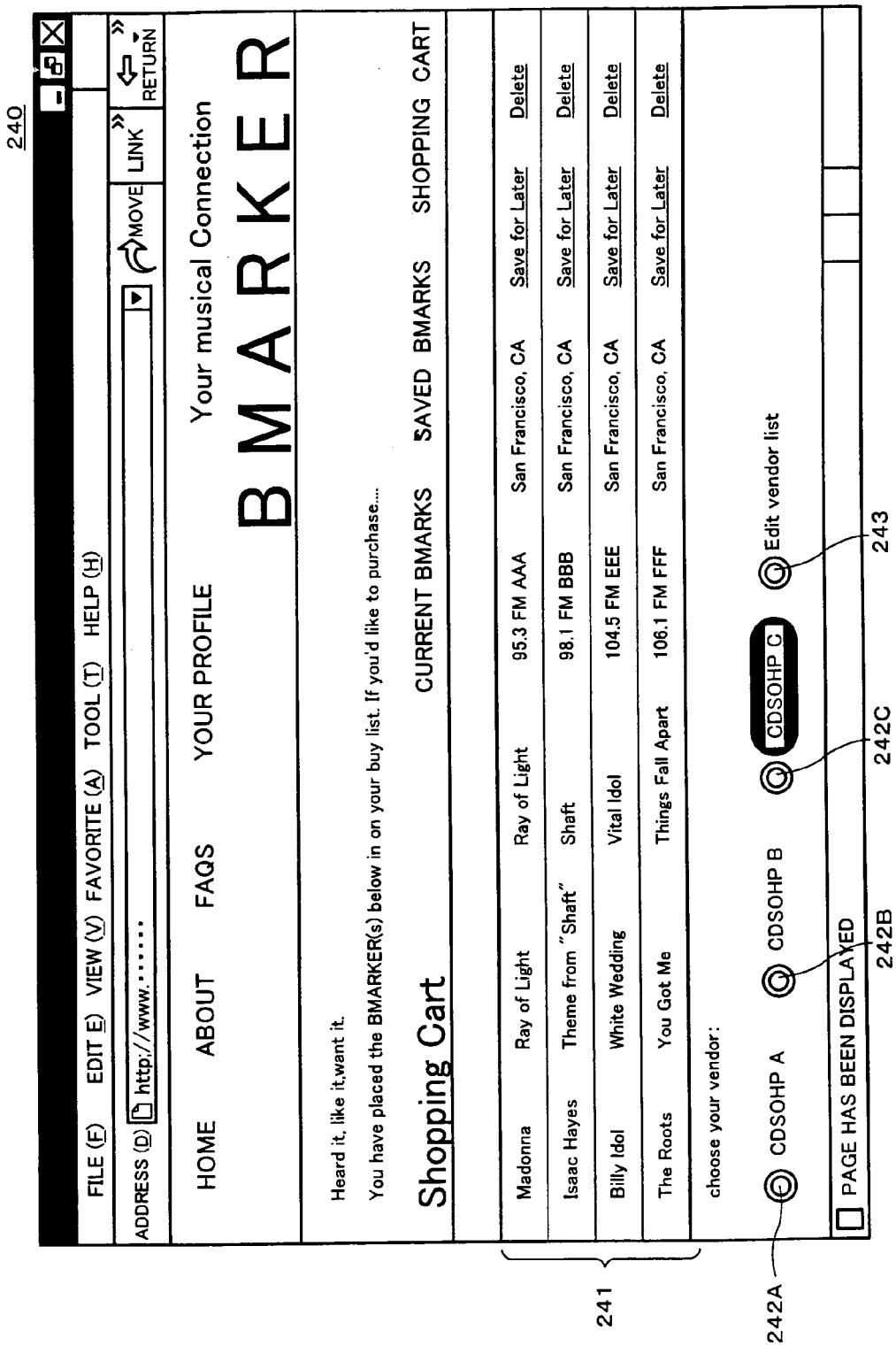
FIG. 26 is a schematic diagram showing an example of a shopping cart screen for displaying the contents of a shopping cart.

FIG. 26 shows an example of a shopping cart screen 240 on which the contents of a shopping cart appear. On the shopping cart screen 240, a list 241 of information of musical pieces contained in the shopping cart and music CDs that contain the musical pieces appears. On the shopping cart screen 240, the user can select a vendor from which he or she will purchase the selected music CD (at step S51). In this example, on the shopping cart screen 240, a plurality of vendors appear. When the user operates one of buttons 242A, 242B, and 242C, the personal computer is connected to a web site of the selected vendor at which he or she can purchase the selected music CD.

When the user operates a button 243, an edit screen (not shown) appears. On the edit screen, the user can add or delete a vendor of music CDs.

Figure 27:
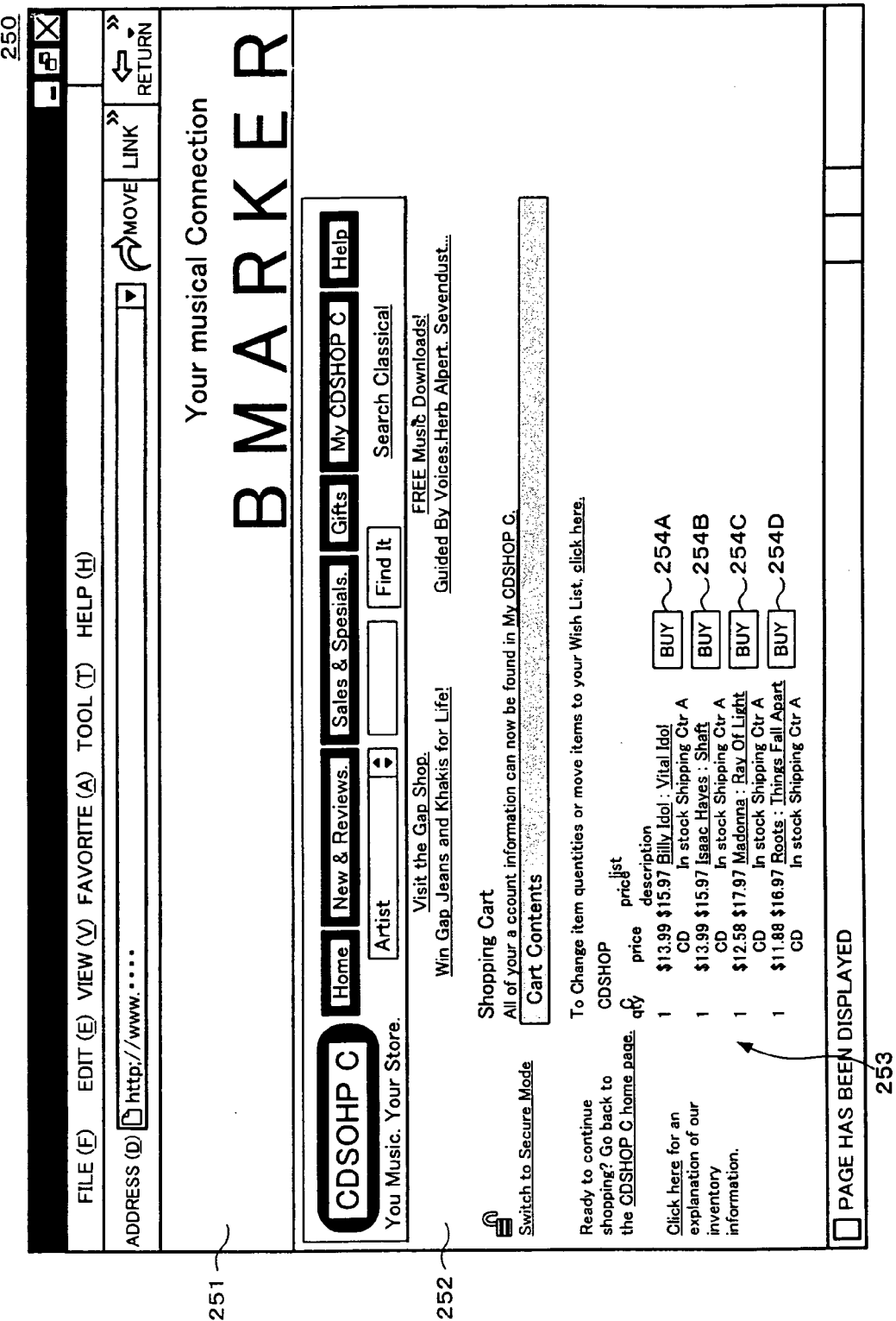
FIG. 27 is a schematic diagram showing an example of a purchasing screen displayed in the case that the personal computer is accessed to a web site on which the user can purchase a music CD.

Next, the case that the user operated the button 242C will be described. When the user operated the button 242C, the personal computer is connected from the web site of the book mark search engine 10 to a "CD SHOP C" web site (at step S52). FIG. 27 shows a purchase screen 250 in the case that the personal computer is connected to the "CD SHOP C" web site. In this example, on the purchase screen 250, an upper area and a lower area appear. The upper area is a screen 251 on which the web site of the book mark search engine 10 appears. The lower area is a screen 252 on which the "CD SHOP C" web site appears.

Data stored in the shopping cart of the book mark search engine 10 is directly transmitted as a purchase item list 253 to the "CD SHOP C" web site. The user decides whether or not the prices of the music CDs are proper corresponding to price information of the music CDs on the list 253 (at step S53). When the prices are proper, the user orders the music CDs in the purchase item list 253. When the user operates the BUY buttons 254A, 254B, 254C, and 254D, he or she can order and purchase the respective music CDs from the "CD SHOP C". The fees of the music CDs can be charged to the credit card that is pre-registered to the "CD SHOP C".

When the fees of the music CDs are not proper, the process is completed. Alternatively, as denoted by a dotted line in FIG. 21, the flow returns to step S51. At step S51, on the shopping cart screen 240, the user can select another vendor.

When the user selected a kiosk terminal unit at step S40, he or she connects the book marker 4 to a predetermined connection terminal of the kiosk terminal unit through the connector 22 (at step S55). The time information, the identification information, the category flag, and the terminal ID 27 are transmitted from the book marker 4 to the kiosk terminal unit. The kiosk terminal unit searches musical piece information corresponding to the transmitted information, displays search results to the user through a predetermined GUI (Graphical User Interface), and asks whether the user wants to listen to a demonstration of the selected music CD or purchase it.

When the desired musical piece and musical piece information have been found (at step S56), the flow advances to step S53. At step S53, the user decides whether or not the fee of the music CD that contains the desired musical piece is proper. When the fee is proper, the user purchases the music CD. When the kiosk terminal unit is installed in a CD store, the user can purchase the desired music CD corresponding to the search result in the CD store.

Next, a second embodiment of the present invention will be described. According to the first embodiment of the present invention, the book mark search engine 10 searches only musical pieces that were broadcast from radio broadcasting stations and television broadcasting stations. In contrast, according to the second embodiment of the present invention, commodity items in commercials that were broadcast from television broadcasting stations are also searched.

FIG. 28 shows an example of the structure of a searching system according to the second embodiment of the present invention. In FIG. 28, similar portions to those in FIG. 2 are denoted by similar reference numerals and their description is omitted. According to the second embodiment of the present invention, since commodity items commercials that were broadcast are searched, there is an advertizer 500. The advertizer 500 may request for example an advertising agent 502 to produce a commercial to be broadcast. The advertising agent 502 may supply the created commercial to a broadcasting station 12.

The advertizer 500 has a web site 501 on Internet. At the web site 501, the advertizer 500 guides commodity items advertised in the commercial. In addition, the user can purchase the advertized commodity items from the web site 501. The web site 501 can be accessed from the gateway device 11.

In the book mark search engine 10, the database 1 shown in FIG. 2 corresponds to a broadcast contents database 1'. In addition, the database 2 corresponds to a customer database 2'. The broadcast contents database 1' stores a play list that contains broadcast time of programs that are broadcast from the broadcasting station 12. The play list may contain information about only commercials that are broadcast from the broadcasting station 12.

The broadcast contents database 1' also stores the URL of the web site 501 of the advertizer 500 and the name of the advertizer 500 in correlation with the play list. In addition, the broadcast contents database 1' stores the names of the advertized commodity items in correlation with the broadcast time. In other words, when the broadcast contents database 1' is searched with a key of a broadcast time, the name of the advertizer 500, the URL of the web site 501 of the advertizer 500, and the name of the commodity item advertized in the commercial that was broadcast at the broadcast time can be obtained as search results.

As with the first embodiment of the present invention, according to the second embodiment, the customer database 2' stores the terminal ID 27 and the user data of each book marker 4. In addition, the customer database 2' can store information about user's favorites such as user's favorite radio stations and television stations registered corresponding to the terminal ID 27.

According to the second embodiment of the present invention, an interface 503 is disposed in the book mark search engine 10. The interface 503 allows predetermined information stored in the broadcast contents database 1' to be easily updated from the outside. For example, the advertizer 500 can update information about commercials in the play list stored in the broadcast contents database 1' through the interface 503. Such information can be updated through the advertizing agent 502 on behalf of the advertizer 500. The play list that represents contents that are broadcast by the broadcasting station 12 can be updated through the interface 503 by the broadcasting station 12.

The interface 503 can be structured with a database management system having a predetermined filter that prohibits the broadcast contents database 1' from being accessed from an authorized person. The interface 503 is preferably provided with a GUI that allows an external authorized client to easily update the contents of the broadcast contents database 1'.

In such a structure, when the user watched a commercial that he or she wants to know or in which he or she is interested, he or she operates the button 20 of the book marker 4 so as to store time information to the memory 26 of the book marker 4. Thereafter, the user connects the book marker 4 to the gateway device 11 so as to transmit time information stored in the memory 26 from the book marker 4 to the gateway device 11 along with the terminal ID 27. The time information and the terminal ID 27 are transmitted from the gateway device 11 to the book mark search engine 10.

The book mark search engine 10 identifies the user using the transmitted terminal ID 27 and searches the broadcast contents database 1' corresponding to the time information. The name of the advertizer 500, the URL of the web site 501 of the advertiser 500, the name of the commodity item of the commercial that was broadcast, and so forth are transmitted to the gateway device 11.

The user can obtain necessary information about the commercial that was broadcast at the time represented by the time information stored in the book marker 4 corresponding to the name of the advertiser 500, the URL of the web site 501 of the advertizer 500, and information such as the name of the commodity item that was broadcast in the commercial. In addition, since the user can know the URL of the web site 501 of the advertiser 500, he or she can access the web site 501 using the gateway device 11. Thus, the user can obtain detailed information about the commodity item and information of other commodity items with which the advertizer 500 deal.

When the web site 501 allows the user to purchase commodity items, he or she can order a desired commodity item to the advertizer 500 using the gateway device 11.

When the customer database 2' stores information about the user's favorites, the advertizer 500 can know favorites of the user who accessed the web site 501 by searching the customer database 2'. Thus, the advertizer 500 can provide the user with relevant information.

According to the first embodiment of the present invention, when the user presses the button 20 twice in a predetermined time period, the category flag represents a television broadcast. Thus, the book mark search engine 10 can determine that time information stored is for a television broadcast. In other words, the searching system according to the second embodiment and the musical piece data searching system can be accomplished at a time.

For example, when a first operating portion that stores time information for a radio broadcast and a second operating portion that stores time information for a television broadcast are disposed, a category flag for a musical piece and a category flag for a commercial are generated. The book mark search engine 10 can determine whether the user wants to know information of a musical piece in a commercial or information of a commodity item advertized in a commercial corresponding to stored time information.

According to the second embodiment of the present invention, there may be money flows among the advertizer 500, the broadcasting station 12, the book mark search engine 10, and the user. FIG. 29 shows money flows that may take place according to the second embodiment.

First of all, an advertisement broadcasting fee M1 takes place between the broadcasting station 12 and the advertizer 500. The advertisement broadcasting fee M1 moves from the advertizer 500 to the broadcasting station 12. When the user accesses the web site 501 of the advertizer 500 corresponding to information obtained by the book mark search engine 10 and purchases a commodity item therefrom, a service fee M2 of the book mark search engine 10 takes place. The service fee M2 moves from the advertizer 500 to the book mark search engine 10. Corresponding to information obtained from the book mark search engine 10, when the user just accesses the web site 501, the service fee M2 may take place. In addition, when the user accesses the web site 501 with information obtained from the book mark search engine 10 and purchases a commodity item from the advertizer 500, the user pays a fee M3 for the commodity item to the advertizer 500.

As was described above, according to the present invention, when a button disposed on a book marker is pressed, information representing time at which the button was pressed is stored to the book marker. When the information representing time is transmitted to a book mark search engine, information of contents that were being broadcast at the time of which the button was pressed is obtained from the book mark search engine. The book mark search engine has a first database that stores play lists that correlatively contain contents of broadcasting stations and broadcast time thereof and a second database that correlatively stores the contents and additional information thereof.

According to a first embodiment of the present invention, when information representing time stored in the book marker is transmitted to the gateway device, the transmission of the information is graphically displayed using a GUI. Thus, the user can visually know that information stored in the book mark is being transmitted to the gateway device. In addition, the user can visually enjoy the transmission state of the information.

According to the first embodiment of the present invention, the user can listen to a demonstration of a musical piece that he or she selected from search results searched by the book mark search engine representing time stored in the book marker using the gateway device. Thus, the user can directly know contents that were being broadcast when he or she stored information to the book marker.

In addition, according to the present invention, when the user performs a predetermined operation for the gateway device corresponding to search results that the book mark search engine searched using information representing time stored in the book marker, the user can access a site at which he or she can purchase the contents. Thus, the user can purchase his or her favorite commodity item even if he or she knows only fragmental information thereof.

In addition, according to the present invention, as search results that the book mark search engine searched using information representing time stored in the book marker, contents that were being broadcast at the time stored in the book marker and contents that were being broadcast earlier than those are obtained. Thus, the operation of the book marker can be performed with a proper margin.

In addition, according to the present invention, since the book mark search engine is provided with an interface that allows information stored in a database to be changed from the outside, the contents of the database can be easily changed by an advertiser, an advertizing agent, and a broadcasting station. Thus, the contents can be flexibly changed.

In addition, according to the present invention, since the main body of the book marker is provided with a dedicated connector that allows data to be exchanged with the outside, information stored in the book marker can be transmitted without need to use an extra cable. Thus, even if a gateway device installed in a retail store or a public facility is used, it is not necessary for the user to carry a connection cable.

In addition, according to the present invention, when one button disposed in the book marker is operated in different manners, a plurality of types of identification information are generated. Thus, the book marker can categorically store information representing time at which a musical piece was being broadcast from a radio broadcasting station, information representing time at which a musical piece was being broadcast from a television broadcasting station, and information representing time at which commodity information was being broadcast from a television broadcasting station.

According to the embodiments of the present invention, since the book marker is formed in a pendant shape, a wrist band shape, a key holder shape, or the like, the user can easily carry it. In addition, the book marker has an appearance suitable for a portable device.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A record medium including a control program causing an inputting unit having a counter to perform the steps of:
    providing a count value from the counter based on a predetermined clock signal;
    storing the count value when a user performs a storing operation during a broadcast;
    communicating the count value stored at the storing the count value step to an external unit;
    obtaining time information indicating when the user storing operation occurred during the broadcast from the communicated count value at the external unit;
    inputting the obtained time information to a searching unit,
    wherein the searching unit searches a database including information indicating broadcast contents and an associated time of broadcasting using at least the obtained time information; and
    providing search results to the user.

2. The record medium as set forth in claim 1, the control program causing the inputting unit to further perform the step of:
    displaying a total number of entries of the count value stored at the storing the count value step.

3. An inputting unit comprising:
    a counter configured to provide a count value based on a predetermined clock signal;
    a storage unit configured to store the count value of said counter when a user performs a storing operation during a broadcast;
    a connecting portion configured to connect the inputting unit to an external unit; and
    a. communicating unit configured to communicate the count value stored in said storage unit to the external unit through said connecting portion,
    wherein the external unit obtains time information indicating when the user storing operation occurred during the broadcast from the communicated count value, inputs the obtained time information to a searching unit, the searching unit searching a database including broadcast information indicating broadcast contents and an associated time of broadcasting using at least the obtained time information, and provides search results to the user.

4. The inputting unit as set forth in claim 3, wherein the broadcast contents include information identifying contents.

5. The inputting unit as set forth in claim 3, wherein the user storing operation during the broadcast occurs when the user determines the broadcast includes desired contents.

6. The inputting unit as set forth in claim 3, further comprising:
a junction unit including,
a base having an attaching portion configured to attach with said connecting portion, the attaching portion being disposed on an upper surface of said base; and
a coupling portion extending from the base, the coupling portion being configured to couple the attaching portion to the external unit.

7. The inputting unit as set forth in claim 3, wherein said connecting portion is integrally formed with a main body of the inputting unit.

8. The inputting unit as set forth in claim 3, wherein the external unit is an information terminal unit installed as a public unit.

9. An inputting unit comprising:
a counter configured to provide a count value based on a predetermined clock signal;
storing means for storing the count value of said counter when a user performs a storing operation during a broadcast;
displaying means for displaying the count value stored in said storing means; and
communicating means for communicating the count value stored in said storing means to an external unit,
wherein the external unit obtains time information indicating when the user storing operation occurred during the broadcast from the communicated count value, inputs the obtained time information to a searching unit, the searching unit searching a database including broadcast information indicating broadcast contents and an associated time of broadcasting using at least the obtained time information, and provides search results to the user.

10. The inputting unit as set forth in claim 9, wherein the count value is represented with spherical members on one side of said displaying means.

11. The inputting unit as set forth in claim 10, wherein when the count value is communicated by said communicating means, a number of spherical members gradually decreases on one side of said displaying means, and
wherein when part of the spherical members disappear, remaining ones of the spherical members move to positions at which the part of the spherical members disappear from.

12. The inputting unit as set forth in claim 9, wherein said displaying means is formed in an almost square shape, and
wherein members representing the count value are arranged in a lattice shape irrespective of a storing order of entries of the count value stored in said storing means.

13. The inputting unit as set forth in claim 9, wherein the count value is represented with rod shaped members by said displaying means.

14. The inputting unit as set forth in claim 9, wherein the count value is represented as a size of an area of said displaying means.

15. The inputting unit as set forth in claim 9, wherein the user storing operation during the broadcast occurs when the user determines the broadcast includes desired contents.

16. The inputting unit as set forth in claim 9, wherein said communicating means communicates the count value to the external unit configured as an information terminal unit installed as a public unit.

17. The inputting unit as set forth in claim 9, wherein the broadcast contents include information identifying contents.

18. An inputting unit comprising:
a counter configured to provide a count value based on a predetermined clock signal;
storing means for storing the count value of said counter when a user performs a storing operation during a broadcast;
communicating means for communicating the count value stored in said storing means to an external unit; and
sound generating means for generating a sound corresponding to the count value stored in said storing means,
wherein the external unit obtains time information indicating when the user storing operation occurred during the broadcast from the communicated count value, inputs the obtained time information to a searching unit, the searching unit searching a database including broadcast information indicating broadcast contents and an associated time of broadcasting using at least the obtained time information, and provides search results to the user.

19. The inputting unit as set forth in claim 18, wherein said sound generating means generates a sound corresponding to the user storing operation when the count value stored in said storing means exceeds a predetermined value.

20. The inputting unit as set forth in claim 18, wherein said sound generating means generates a sound when the count value stored in said storing means exceeds a predetermined value and the user storing operation is performed.

21. The inputting unit as set forth in claim 18, wherein the user storing operation during the broadcast occurs when the user determines the broadcast includes desired contents.

22. The inputting unit as set forth in claim 18, wherein said communicating means communicates the count value to the external unit configured as an information terminal unit installed as a public unit.

23. The inputting unit as set forth in claim 18, wherein the broadcast contents include information identifying contents.

24. An inputting unit for inputting information representing time, comprising:
a counter configured to provide a count value based on a predetermined clock signal;
first storing means for storing the count value of said counter when a user performs a storing operation during a broadcast;
identification information generating means for generating predetermined content identification information corresponding to the user storing operation;
second storing means for storing the predetermined content identification information generated by said identification information generating means; and
communicating means for communicating the count value stored in said first storing means and the predetermined content identification information stored in said second storing means to an external unit,
wherein the external unit obtains time information indicating when the user storing operation occurred during the broadcast from the communicated count value, inputs the obtained time information and the predetermined content identification information to a searching unit, the searching unit searching a database including broadcast information indicating broadcast contents and an associated time of broadcast using at least the obtained time information, and provides search results to the user.

25. The inputting unit as set forth in claim 24, wherein said first storing means and said second storing means store the count value and the predetermined content identification information to a common memory disposed in the inputting unit.

26. The inputting unit as set forth in claim 24, wherein said first storing means and said second storing means store the count value and the predetermined content identification information to discrete memories disposed in the inputting unit.

27. The inputting unit as set forth in claim 24, further comprising:
at least one button,
wherein said identification information generating means includes means for detecting different manners the user pressing the at least one button and for generating different content identification information corresponding to the different manners the user pressing the at least one button.

28. The inputting unit as set forth in claim 24, further comprising:
displaying means for displaying the count value stored in said first storing means, wherein said displaying means displays the count value in a different manner that varies corresponding to the predetermined content identification information.

29. The inputting unit as set forth in claim 24, wherein the user storing operation during the broadcast occurs when the user determines the broadcast includes desired broadcast contents.

30. The inputting unit as set forth in claim 24, wherein said communicating means communicates the count value to the external unit configured as an information terminal unit installed as a public unit.

31. The inputting unit as set forth in claim 24, wherein the predetermined content identification information identifies whether contents are television broadcast contents or radio broadcast contents.

32. The inputting unit as set forth in claim 24, wherein the predetermined content identification information identifies whether contents were broadcasted in a predetermined area or out of the predetermined area.

33. The inputting unit as set forth in claim 24, wherein the broadcast contents include information identifying contents.

34. An inputting unit comprising:
a counter configured to provide a .count value based on a predetermined clock signal;
first storing means for storing the count value of said counter when a user performs a storing operation during a broadcast;
communicating means for communicating with an external unit and communicating the count value stored in said first storing means to the external unit; and
second storing means for storing data transmitted from the external unit through said communicating means,
wherein the external unit obtains time information indicating when the user storing operation occurred during the broadcast from the communicated count value, inputs the obtained time information to a searching unit, the searching unit searching a database including broadcast information indicating broadcast contents and an associated time of broadcasting using at least the obtained time information, and provides search results to the user.

35. The inputting unit as set forth in claim 34, wherein the broadcast contents include information identifying contents.

36. The inputting unit as set forth in claim 34, wherein the data stored in said second storing means includes the broadcast contents or information thereabout.

37. The inputting unit as set forth in claim 34, wherein the data stored in said second storing means is compression-encoded audio data, and
wherein the inputting unit further comprises:
audio data reproducing means for decoding the compression-encoded audio data and reproducing the decoded audio data.

38. The inputting unit as set forth in claim 34, wherein the data stored in the second storing means is encrypted data corresponding to a predetermined encrypting method, and
wherein the inputting unit further comprises:
decrypting means for decrypting the encrypted data.

39. The inputting unit as set forth in claim 34, wherein said first storing means and said second storing means store the count value and the data to a common memory disposed in the inputting unit.

40. The inputting unit as set forth in claim 34, wherein said first storing means and said second storing means store the count value and the data to discrete memories disposed in the inputting unit.

41. The inputting unit as set forth in claim 34, wherein the user storing operation during the broadcast occurs when the user determines the broadcast includes desired broadcast contents.

42. The inputting unit as set forth in claim 34, wherein said communicating means communicates the count value to the external unit configured as an information terminal unit installed as a public unit.

43. An inputting unit comprising:
a counter configured to provide a count value based on a predetermined clock signal;
storing means for storing the count value of said counter when a user performs a storing operation during a broadcast;
sound generating means for generating a predetermined sound when the count value is stored to said storing means corresponding to the storing operation performed by the user; and
communicating means for communicating the count value stored in said storing means to an external unit,
wherein the external unit obtains time information indicating when the user storing operation occurred during the broadcast from the communicated count value, inputs the obtained time information to a searching unit, the searching unit searching a database including broadcast information indicating broadcast contents and an associated time of broadcasting using at least the obtained time information, and provides search results to the user.

44. The inputting unit as set forth in claim 43, wherein the broadcast information includes information about contents.

45. An inputting method for an inputting unit having a counter, the method comprising the steps of:
providing a count value from the counter based on a predetermined clock signal;
storing the count value when a user performs a storing operation during a broadcast;
directly connecting the inputting unit to an external unit;
communicating the count value stored at the storing the count value step to the external unit connected at the connecting step;
obtaining time information indicating when the user storing operation occurred during the broadcast from the communicated count value at the external unit;
inputting the obtained time information to a searching unit through the external unit, wherein the searching unit searches a database including information indicating broadcast contents and an associated time of broadcasting using at least the obtained time information; and providing search results to the user.

46. The inputting method as set forth in claim 45, wherein the broadcast contents include information identifying contents.

47. An inputting method for an inputting unit having a counter, the method comprising the steps of:

providing a count value from the counter based on a predetermined clock signal;

storing the count value when a user performs a storing operation during a broadcast;

displaying the count value stored at the storing the count value step;

communicating the count value stored at the storing the count value step to an external unit;

obtaining time information from the communicated count value, wherein the time information indicating when the user storing operation occurred during the broadcast is obtained at the external unit and then inputted to a searching unit, the searching unit searching a database including information indicating broadcast contents and an associated time of broadcasting using at least the obtained time information; and providing search results to the user.

48. The inputting method as set forth in claim 47, wherein the broadcast contents include information identifying contents.

49. An inputting method for an inputting unit having a counter, the method comprising the steps of:

providing a count value from the counter based on a predetermined clock signal;

storing the count value when a user performs a storing operation during a broadcast;

communicating the count value stored in the storing the count value step to an external unit;

generating a sound corresponding to the count value stored in the storing the count value step, wherein time information indicating when the user storing operation occurred during the broadcast is obtained from the communicated count value at the external unit and then inputted to a searching unit, the searching unit searching a database including information indicating broadcast contents and an associated time of broadcasting using at least the obtained time information; and providing search results to the user.

50. The inputting method as set forth in claim 49, wherein the broadcast contents include information identifying contents.

51. An inputting method for an inputting unit having a counter, the method comprising the steps of:

providing a count value from the counter based on a predetermined clock signal;

storing the count value when a user performs a storing operation during a broadcast;

generating predetermined identification information corresponding to the storing operation during the broadcast;

storing the predetermined identification information generated in the generating predetermined identification information step;

communicating the count value and the predetermined identification information stored when the user performed the storing operation during the broadcast to an external unit, wherein time of day information indicating when the user storing operation occurred during the broadcast is obtained from the communicated count value at the external unit and then inputted to a searching unit, the searching unit searching a database including information indicating broadcast contents and an associated time of day of broadcasting using at least the obtained time of day information; and providing search results to the user.

52. The inputting method as set forth in claim 51, wherein the broadcast contents include information identifying contents.

53. An inputting method for an inputting unit having a counter, the method comprising the steps of:

providing a count value from the counter based on a predetermined clock signal;

storing the count value when a user performs a storing operation during a broadcast;

communicating the count value stored when the user performed the storing operation during the broadcast to an external unit;

storing data transmitted from the external unit during the communicating step, wherein time of day information indicating when the user storing operation occurred during the broadcast is obtained from the communicated count value at the external unit and then inputted to a searching unit, the searching unit searching a database including information indicating broadcast contents and an associated time of day of broadcasting using at least the obtained time of day information; and providing search results to the user.

54. The inputting method as set forth in claim 53, wherein the broadcast contents include information identifying contents.

* * * * *